(12) United States Patent
Kaplan

(10) Patent No.: US 6,770,032 B2
(45) Date of Patent: Aug. 3, 2004

(54) PASSIVE ULTRASONIC SENSORS, METHODS AND SYSTEMS FOR THEIR USE

(75) Inventor: Shay Kaplan, Givat Elah (IL)

(73) Assignee: Microsense Cardiovascular Systems 1996, Tel Aviv (IL)

( * ) Notice: Subject to any disclaimer, the term of this patent is extended or adjusted under 35 U.S.C. 154(b) by 49 days.

(21) Appl. No.: 10/307,518

(22) Filed: Dec. 2, 2002

(65) Prior Publication Data

US 2003/0176789 A1 Sep. 18, 2003

Related U.S. Application Data

(60) Provisional application No. 60/334,598, filed on Dec. 3, 2001.

(51) Int. Cl.[7] .................................................. A61B 8/00
(52) U.S. Cl. ........................................ 600/437; 600/459
(58) Field of Search ................................. 600/437, 438, 600/440, 441, 442, 443, 444–447, 449–472; 73/625, 626; 367/7, 11, 130, 138; 128/916

(56) References Cited

U.S. PATENT DOCUMENTS

| 3,853,117 A | 12/1974 | Murr |
| 4,060,716 A | 11/1977 | Pekrul et al. |
| 4,109,644 A | 8/1978 | Kojima |

(List continued on next page.)

FOREIGN PATENT DOCUMENTS

| EP | 272 244 | 6/1988 |
| EP | 371 592 | 6/1990 |
| EP | 741 873 | 11/1996 |
| GB | 2 223 311 | 4/1990 |
| GB | 2 235 773 | 3/1991 |
| IL | 108470 | 6/1998 |
| JP | 1119729 | 5/1989 |
| WO | 95/20769 | 8/1995 |

OTHER PUBLICATIONS

Carter C. Collins, "Miniature Passive Pressure Transensor for Implanting in the Eye", IEEE Transactions on Bio-Medical Engineering, vol. BME–14, No. 2, Apr. 1967.

Dufour et al., "A Comparison Between Micromachined Pressure Sensors Using Quartz or Silicon Vibrating Beams", IEEE, 1991.

W.K. Schomburg et al., "Mikromembranen Fur Beruhrugslose Messungen Mit Ultraschall", VDI Berichte No. 939, 1992.

English Translation of W.K. Schomburg et al., "Micromembranes for Contactless Measurements Using Ultrasound", VDI Berichte No. 939, 1992.

*Primary Examiner*—Ali Imam
(74) *Attorney, Agent, or Firm*—Eitan, Pearl, Latzer & Cohen Zedek, LLP

(57) ABSTRACT

Passive acoustic sensors having at least two flat parallel acoustically reflecting surfaces. At least one reflecting surface is on a member which is movable such that the distance between the reflecting surfaces varies as a function of a physical variable to be determined. Preferably, the sensor is made such that the intensity of a first portion of incident acoustic waves which is reflected from one reflecting surface is equal or substantially similar to the intensity of a second portion of the incident acoustic waves which is reflected from the other reflecting surface. The first portion and the second portion interfere to form a returning acoustic signal having one or more maximally attenuated frequencies which is correlated with the value of the physical variable. The internal acoustic signal is received and processed to determine the value of the physical variable from one or more of the maximal attenuation frequencies. Methods and systems for using the passive sensors are disclosed.

31 Claims, 6 Drawing Sheets

U.S. PATENT DOCUMENTS

| | | |
|---|---|---|
| 4,127,110 A | 11/1978 | Bullara |
| 4,257,001 A | 3/1981 | Partain et al. |
| 4,265,251 A | 5/1981 | Tickner |
| 4,378,809 A | 4/1983 | Cosman |
| 4,513,250 A | 4/1985 | Harman |
| 4,513,750 A | 4/1985 | Heyman et al. |
| 4,703,327 A | 10/1987 | Rossetti et al. |
| 4,725,841 A | 2/1988 | Nysen et al. |
| 4,816,743 A | 3/1989 | Harms et al. |
| 4,893,852 A | 1/1990 | Harris et al. |
| 5,022,268 A | 6/1991 | Wolf et al. |
| 5,023,593 A | 6/1991 | Brox |
| 5,140,992 A | 8/1992 | Zuckerwar et al. |
| 5,155,548 A | 10/1992 | Danver et al. |
| 5,195,520 A | 3/1993 | Schlief et al. |
| 5,300,120 A | 4/1994 | Knapp et al. |
| 5,544,656 A | 8/1996 | Pitsillides et al. |
| 5,619,997 A | 4/1997 | Kaplan |
| 5,833,603 A | 11/1998 | Kovacs et al. |
| 5,989,190 A | 11/1999 | Kaplan |
| 6,083,165 A | 7/2000 | Kaplan |

PASSIVE ULTRASONIC SENSORS, METHODS AND SYSTEMS FOR THEIR USE

This application claims the benefit of Provisional Application No. 60/334,598, filed Dec. 3, 2001.

FIELD OF THE INVENTION

The present invention relates to passive sensors in general and to ultrasonic passive sensors in particular.

BACKGROUND OF THE INVENTION

Passive sensors (for implanting into the human body or for mounting at some inaccessible location within a machine) are known in the art. These sensors are typically electromagnetic, providing an electromagnetic signal when activated.

The prior art sensor systems typically comprise a sensor, implanted into the machine, and an activating and detecting system. The sensor is typically an oscillating circuit whose vibration frequency changes in response to the physical variable to be measured. The oscillating circuit typically includes a capacitor and an inductor, one of which is built to vary in accordance with the physical variable being measured. As a result, the vibration frequency of the circuit is a function of the physical variable.

When the sensor is irradiated with electromagnetic energy from the activating system, some of the energy is absorbed by the oscillating circuit, depending on how close the incident frequency or frequencies are to the resonant frequency of the circuit (which, in turn, depends on the physical variable being measured). The change in the electromagnetic field due to the absorption of energy by the oscillating circuit is detected by the detecting system.

Electromagnetic sensors and systems are described in the U.S. Pat. No. 4,127,110 and in an article: Carter C. Collins, "Miniature Passive Pressure Transensor for Implanting in the Eye", IEEE Transactions on Bio-Medical Engineering, Vol. BME-14, No. 2, April 1967.

Unfortunately, within living tissue, the passive sensor is detectable within a range of approximately 10 times the diameter of its antenna (part of the oscillating circuit). Furthermore, the sensor system is not operative within a conductive enclosure.

Methods, devices and systems, using ultrasonically activated passive sensors usable for sensing different physical parameters within a human body or in other environments and scientific and industrial applications, have been described. U.S. Pat. No. 5,619,997 to Kaplan discloses a passive sensor system using ultrasonic energy. An ultrasonic activation and detection system ultrasonically activates passive sensors which may be implanted in a body or disposed in any other environment. The activated passive sensors or parts thereof vibrate or resonate at a frequency which is a function of the value of the physical variable to be measured. The passive sensors thus absorb ultrasonic energy from the exciting ultrasonic beam mostly at the frequency of vibration (resonance frequency) of the sensor. The frequency (or frequency range) at which the passive sensor absorbs energy may be detected by a suitable detector and used to determine the value of the physical parameter.

Additionally, if the exciting ultrasonic beam is pulsed, the ultrasonic sensor may continue to vibrate after the excitation beam is turned off. The frequency of the ultrasonic radiation emitted by the activated passive sensor after turning the excitation beam off may be detected and used to determine the value of the physical parameter.

Since more than one physical variable may influence the vibration frequency of passive sensors, a correction may be needed in order to compensate for the effects of other physical parameters unrelated to the physical parameter which needs to be determined on the measured sensor vibration frequency. For example, if pressure is the physical parameter to be determined, changes in temperature may affect the vibration frequency of the sensor. U.S. Pat. Nos. 5,989,190 and 6,083,165 to Kaplan disclose compensated sensor pairs and methods for their use for compensating for the effects of unrelated different physical variables on the determined value of another physical variable which is being determined.

Alternative methods for constructing and using passive ultrasonic sensors for performing measurements of a physical parameters may further advance the possibilities of performing measurements of physical parameters inside living organisms and in closed systems in industrial applications.

SUMMARY OF THE INVENTION

There is therefore provided in accordance with an embodiment of the present invention a passive acoustic sensor for determining the value of a physical variable in a measurement region. The sensor includes a housing having two spaced apart substantially parallel and substantially flat acoustically reflecting surfaces. At least one of the acoustically reflecting surfaces is a surface on a movable member configured to be movable with respect to the housing, such that the distance between the acoustically reflecting surfaces varies as a function of the physical variable. The acoustically reflecting surfaces are configured such that when incident acoustic waves having a range of frequencies are directed at the sensor in a direction substantially orthogonal to the acoustically reflecting surfaces, a first portion of the incident waves is reflected from one of the acoustically reflecting surfaces to form a first reflected wave, and a second portion of the incident waves is reflected from the remaining acoustically reflecting surface to form a second reflected wave. The first reflected wave and the second reflected wave interfere to form a returning acoustic signal having at least one maximally attenuated frequency which is correlated with the value of the physical variable in the measurement region in which the sensor is disposed.

Furthermore, in accordance with an embodiment of the present invention, one or more of the physical parameters of the sensor is selected such that the intensity of the first reflected wave is equal or substantially similar to the intensity of the second reflected wave.

Furthermore, in accordance with an embodiment of the present invention, one of the acoustically reflecting surfaces is a static surface of one of the walls of the housing.

Furthermore, in accordance with an embodiment of the present invention, one of the acoustically reflecting surfaces is a static surface of a wall of the housing. The housing has an open recess therein. The movable member is sealingly attached within the recess to form a sealed chamber within the housing. The chamber has a pressure level therein. The two acoustically reflecting surfaces are exposed on the external surface of the sensor for contacting a fluid within the region of measurement.

Furthermore, in accordance with an embodiment of the present invention, one or more of the parameters selected from the acoustic impedance of at least one component of the sensor, the area of the first reflecting surface of the two acoustically reflecting surfaces, the area of the second reflecting surface of the two acoustically reflecting surfaces, and any combinations thereof is selected such that the intensity of the first reflected wave is equal or substantially similar to the intensity of the second reflected wave.

Furthermore, in accordance with an embodiment of the present invention, the at least one component of the sensor is selected from the movable membrane of a portion thereof, and the wall of the housing underlying the static surface or a portion thereof, and the combination thereof.

Furthermore, in accordance with an embodiment of the present invention, the housing has an opening therein and a back wall opposing the opening. At least a part of the surface of the back wall facing the opening is the second reflecting surface of the two acoustically reflecting surfaces. The movable member is sealingly attached to the opening to form a sealed chamber within the housing. At least a portion of the surface of the movable member outside of the sealed chamber is the first reflecting surface of the two acoustically reflecting surfaces. The chamber has a fluid therein. At least a first part of the chamber defined between the movable member and the second reflecting surface is filled with the fluid. The sealed chamber includes at least a second part thereof. The second part of the sealed chamber is at least partially filled with a gas or a mixture of gases.

Furthermore, in accordance with an embodiment of the present invention, one or more of the physical parameters selected from the acoustic impedance of at least one component of the sensor, the thickness of the movable member, the area of the first reflecting surface of the two acoustically reflecting surfaces, the area of the second reflecting surface of the two acoustically reflecting surfaces, the acoustic impedance of the fluid within the sealed chamber, the distance between the movable member and the second reflecting surface, and any combinations thereof are selected such that the intensity of the first reflected wave is approximately equal to the intensity of the second reflected wave.

Furthermore, in accordance with an embodiment of the present invention, the at least one component of the sensor is selected from the movable membrane of a portion thereof, the back wall or a portion thereof, and the combination thereof.

Furthermore, in accordance with an embodiment of the present invention, the physical variable is the osmotic pressure in a first solution disposed in the measurement region. The housing has a second solution sealed therein. At least one component of the sensor selected from one or more of the walls of the housing and the movable member includes a semi-permeable material. The semi-permeable material is in contact with the first solution on one side thereof and with the second solution on another side thereof. The first solution includes at least one solvent capable of passing through the semi-permeable material, and the second solution includes at least one solute which cannot pass through the semi-permeable material.

Furthermore, in accordance with an embodiment of the present invention, the housing of the sensor is a hollow housing having a hollow passage passing therein. The movable member includes a flat member movably attached within the passage to sealingly close the passage. One of the two acoustically reflecting surfaces is the surface of a portion of the walls of the housing substantially parallel to the acoustically reflecting surface of the movable member. The housing is configured to be sealingly mounted within a wall of a vessel containing a fluid such that the two acoustically reflecting surfaces are in contact with the fluid, and the physical variable is the pressure within the fluid.

There is also provided in accordance with another embodiment of the present invention a passive acoustic sensor for determining the value of a physical variable in a measurement region. The sensor includes a housing. The sensor also includes a first reflecting means formed in the housing or attached thereto. The first reflecting means has a first substantially flat acoustically reflecting surface for reflecting a first portion of incident acoustic waves directed perpendicular to the surface to form a first reflected wave. The sensor also includes a second acoustically reflecting means formed in the housing or attached thereto. The second reflecting means has a second substantially flat acoustically reflecting surface substantially parallel to the first surface for reflecting a second portion of the incident acoustic waves to form a second reflected wave. At least one of the first acoustically reflecting surface and second acoustically reflecting surface is a surface on a movable member configured to be movable with respect to the housing such that the distance between the first acoustically reflecting surface and the second acoustically reflecting surface varies as a function of the physical variable. The first and second acoustically reflecting means are configured such that the first reflected wave and the second reflected wave interfere to form a returning acoustic signal having at least one maximally attenuated frequency which is correlated with the value of the physical variable in the measurement region in which the sensor is disposed.

Furthermore, in accordance with an embodiment of the present invention, one or more of the physical parameters of the sensor is selected such that the intensity of the first reflected wave is substantially similar to the intensity of the second reflected wave to maximize the attenuation of the maximally attenuated frequency in the returning acoustic signal.

There is also provided in accordance with another embodiment of the present invention, a system for determining the value of a physical variable in a measurement region. The system includes at least one acoustic transducer configured for directing acoustic waves having a range of frequencies towards a passive acoustic sensor disposed in the measurement region. The system also includes at least one acoustic receiver configured for receiving acoustic waves reflected from the passive acoustic sensor to generate a received signal. The system also includes at least one passive acoustic sensor. The sensor includes a housing having at least two spaced apart substantially parallel and substantially flat acoustically reflecting surfaces. At least one of the acoustically reflecting surfaces is a surface on a movable member configured to be movable with respect to the housing such that the distance between the acoustically reflecting surfaces varies as a function of the physical variable. The system also includes a controller unit operatively coupled to the transducer(s) and to the receiver(s), for controlling the operation of the transducer(s) and of the receiver(s). The controller is configured for acquiring data representing the received signal, processing the data to determine the value of at least one maximal attenuation frequency within the range of frequencies, and determining the value of the physical variable from the value of the maximal attenuation frequency or frequencies.

Furthermore, in accordance with an embodiment of the present invention, at least one of the acoustic transducer(s) and the acoustic receiver(s) includes at least one piezoelectric device.

Furthermore, in accordance with an embodiment of the present invention, the acoustic transducer is a piezoelectric transducer, and the piezoelectric transducer is configured to operate as the acoustic receiver.

There is further provided, in accordance with another embodiment of the present invention, a method for determining a physical variable in a measurement region using a passive acoustic sensor. The method includes the step of disposing in the measurement region a passive acoustic sensor. The sensor includes a housing having at least two spaced apart substantially parallel and substantially flat acoustically reflecting surfaces. At least one of the acoustically reflecting surfaces is a surface on a movable member configured to be movable with respect to the housing such that the distance between the acoustically reflecting surfaces varies as a function of the physical variable. The method also includes the step of directing acoustic waves having a range of frequencies at the sensor such that a first portion of the waves is reflected from one of the acoustically reflecting surfaces to form a first reflected wave and a second portion of the incident waves is reflected from the remaining acoustically reflecting surface to form a second reflected wave. The first reflected wave and the second reflected wave interfere to form a returning acoustic signal. The method also includes the step of acquiring data representing the returning acoustic signal. The method also includes the step of processing the data to determine the value of at least one maximal attenuation frequency, and the step of determining the value of the physical variable from the value of the maximal attenuation frequency (or frequencies).

Furthermore, in accordance with an embodiment of the present invention, the physical variable is the pressure in the measurement region.

Furthermore, in accordance with an embodiment of the present invention, the acoustic waves comprise sonic waves and ultrasonic waves.

Furthermore, in accordance with an embodiment of the method of the present invention, the physical variable is the osmotic pressure in a first solution disposed in the measurement region. The housing has a second solution sealed therein. At least one component of the sensor selected from one or more of the walls of the housing and the movable member includes a semi-permeable material. The semi-permeable material is in contact with the first solution on one side thereof and with the second solution on another side thereof. The first solution includes at least one solvent capable of passing through the semi-permeable material and the second solution includes at least one solute which cannot pass through the semi-permeable material.

Furthermore, in accordance with an embodiment of the present invention, the step of processing includes performing frequency domain analysis of the data to obtain frequency domain data of the returning acoustic signal and determining least one maximal attenuation frequency from the frequency domain data.

Furthermore, in accordance with an embodiment of the present invention, the frequency domain analysis includes performing a Fourier transform on the data to obtain Fourier transform data representing the intensity of the returning acoustic signal as a function of frequency, and determining the maximal attenuation frequency or frequencies from the Fourier transform data.

Furthermore, in accordance with an embodiment of the present invention, the frequency domain analysis includes performing a wavelet transform on the data to obtain wavelet transform data, and determining the maximal attenuation frequency or frequencies from the wavelet transform data.

Furthermore, in accordance with an embodiment of the present invention, the step of determining includes determining the value of the physical variable from the value of the maximal attenuation frequency or frequencies using a look up table or other calibration data obtained by calibrating the sensor.

Furthermore, in accordance with an embodiment of the present invention, the acoustic waves directed at the sensor are selected from a continuous beam of acoustic waves, one or more pulses of acoustic waves, chirped acoustic waves spanning the range of frequencies, and a tone burst series spanning the range of frequencies.

Furthermore, in accordance with an embodiment of the present invention, the method further includes the step of processing the data to compensate for variations in the intensity of the acoustic waves directed at the sensor at different frequencies. The variations are introduced by the characteristics of the acoustic transducer used to produce the acoustic waves.

Furthermore, in accordance with an embodiment of the present invention, the step of directing includes directing the acoustic waves towards the sensor in a direction substantially perpendicular to the acoustically reflecting surfaces.

There is further provided, in accordance with another embodiment of the present invention, a method for using a passive acoustic sensor including a housing having at least two spaced apart substantially parallel and substantially flat acoustically reflecting surfaces. At least one of the acoustically reflecting surfaces is a surface on a movable member configured to be movable with respect to the housing such that the distance between the acoustically reflecting surfaces varies as a function of the physical variable. The sensor is disposed in a measurement region. The method includes the step of directing acoustic waves having a range of frequencies at the passive sensor such that a first portion of the waves is reflected from one of the acoustically reflecting surfaces to form a first reflected wave and a second portion of the incident waves is reflected from the remaining acoustically reflecting surface to form a second reflected wave. The first reflected wave and the second reflected wave interfere to form a returning acoustic signal. The method also includes the step of acquiring data representing the returning acoustic signal. The method also includes the step of processing the data to determine the value of at least one maximal attenuation frequency within the range of frequencies.

Furthermore, in accordance with an embodiment of the present invention, the method further includes the step of determining the value of a physical variable in the measurement region from the value of at least one maximal attenuation frequency.

Furthermore, in accordance with an embodiment of the method of the present invention, the physical variable is the pressure in the measurement region.

Finally, in accordance with an embodiment of the method of the present invention, the physical variable is the osmotic pressure in a first solution disposed in the measurement region. The housing has a second solution sealed therein. At least one component of the sensor selected from one or more of the walls of the housing and the movable member includes a semi-permeable material. The semi-permeable material is in contact with the first solution on one side thereof and with the second solution on another side thereof. The first solution includes at least one solvent capable of passing through the semi-permeable material, and the second solution includes at least one solute which cannot pass through the semi-permeable material.

BRIEF DESCRIPTION OF THE DRAWINGS

The invention is herein described, by way of example only, with reference to the accompanying drawings, in which like components are designated by like reference numerals, wherein.

DETAILED DESCRIPTION OF THE INVENTION

Notation Used Throughout

The following notation is used throughout this document.

| Term | Definition |
| --- | --- |
| FFT | Fast Fourier Transform |
| WT | Wavelet Transform |
| PTFE | Polytetrafluoroethylene |
| PE | Polyethylene |
| PP | Polypropylene |

The present invention discloses passive ultrasonic sensors and ultrasonic sensor systems for determining the values of various different physical parameters in various applications.

Figure 1A:
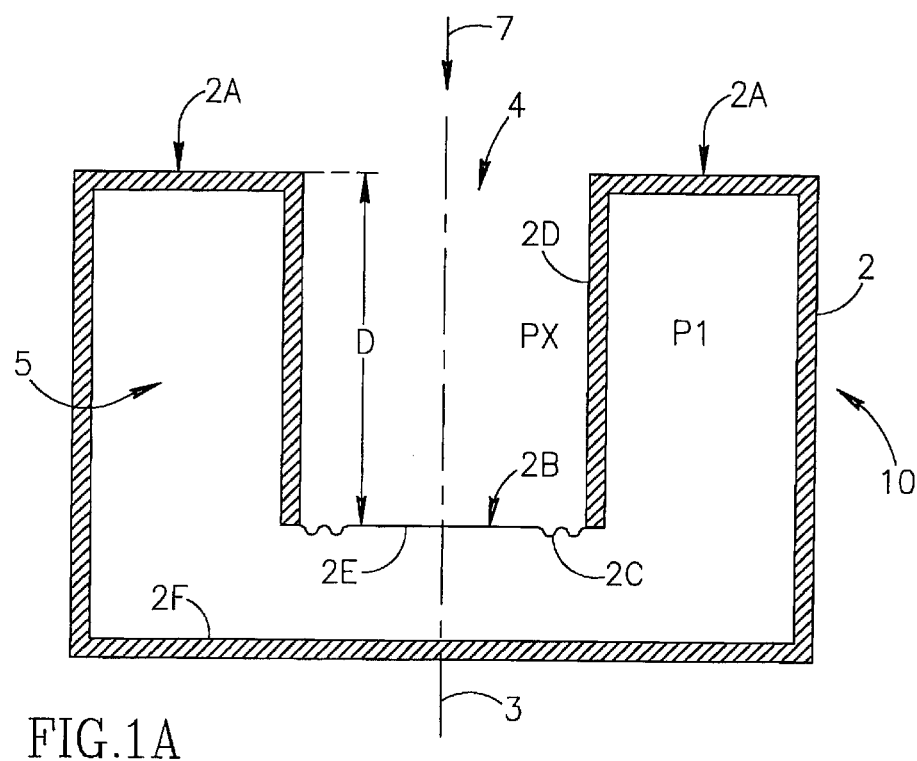
FIG. 1A is a schematic cross-sectional view, illustrating a passive ultrasonic pressure sensor constructed in accordance with an embodiment of the present invention.
Figure 1B:
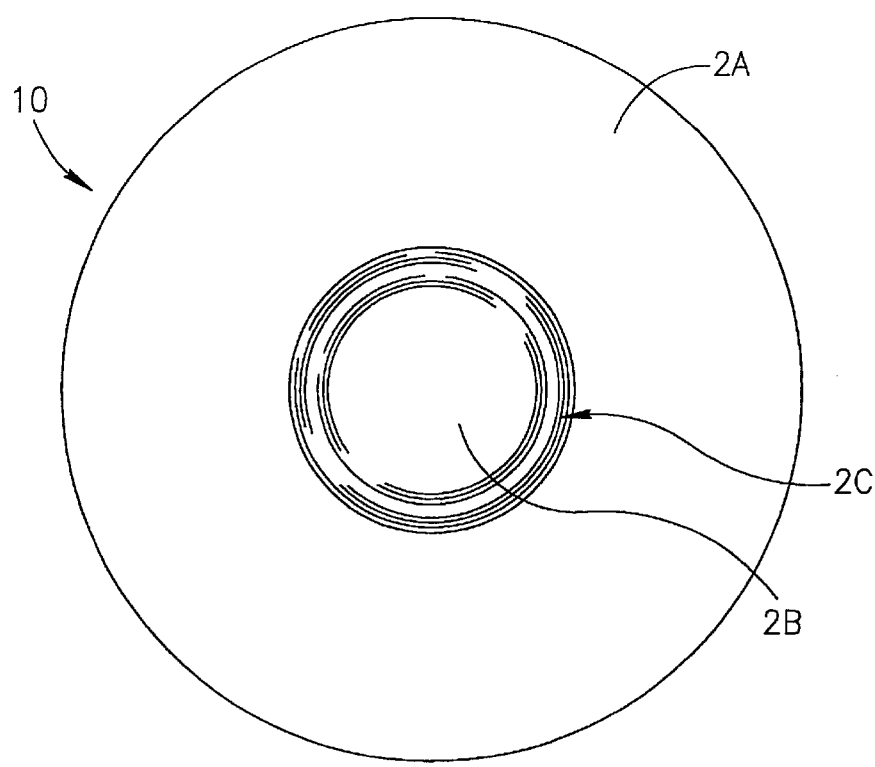
FIG. 1B is a schematic front view of the sensor of FIG. 1A as viewed from a direction indicated by the arrow 7 of FIG. 1A.

Reference is now made to FIGS. 1A and 1B. FIG. 1A is a schematic cross-sectional view, illustrating a passive ultrasonic pressure sensor constructed in accordance with an embodiment of the present invention. FIG. 1B is a front view of the sensor of FIG. 1A as viewed from a direction indicated by the arrow 7 of FIG. 1A.

The passive ultrasonic sensor 10 of FIGS. 1A–1B may include a recessed cylindrical housing 2 having a longitudinal axis 3. The housing 2 may have an open recess 4 therein. The recess 4 is partially defined by recess walls 2D which form part of the housing 2. The housing 2 has first reflective surface 2A which is capable of reflecting acoustic waves (such as for example sonic waves and ultrasonic waves). The housing 2 may further include a movable member 2E having a reflective surface 2B capable of reflecting acoustic waves. The movable member 2E may be sealingly and movably attached to the end of the recess walls 2D of the housing 2 by a flexible member 2C. The flexible member 2C may be shaped such that the movable member 2E may be moved if a force is applied thereto. The reflective surface 2B of the movable member 2E may be thus moved to different positions along the longitudinal axis 3. The sensor 10 has a sealed cavity 5 therewithin. The cavity 5 may contain a gas or a gas mixture such as air or nitrogen or argon, or any other suitable gas or gas mixture known in the art. The pressure P1 of the gas or gas mixture contained within the sealed cavity 5 may be higher, lower, or equal to the pressure outside the sensor 10 at the time of sealing of the cavity 5, depending on the particular application.

In accordance with another embodiment of the present invention, the cavity 5 may be evacuated. If the cavity 5 has a vacuum therein, this may make the sensor less sensitive to temperature changes, which may be advantageous if the sensor 10 is used in an environment in which the temperature is not stabilized.

The movable member 2B may have a circular shape and the reflecting surface 2A may be shaped as an annular surface as illustrated in FIG. 1B. It is noted, however, that other different shapes and geometry may also be used for the movable member 2B and/or the reflecting surface 2A, including but not limited to rectangular, or polygonal geometry, or any other suitable symmetrical or non-symmetrical shapes or geometry.

When the pressure PX outside the sensor is varied, the position of the movable member 2E may change and the distance D between the plane of the reflective surface 2A and the plane of the reflective surface 2B may change. For example, if the outside pressure PX increases, the distance D will increase as the movable member 2E moves away from the plane of the reflective surface 2A. Similarly, if the outside pressure PX decreases, the distance D will decrease as the movable member 2E moves towards the plane of the reflective surface 2A. Thus, the distance D between the plane of the reflective surface 2A and the plane of the reflective surface 2B is a function of the pressure PX.

When the sensor 10 is immersed in a liquid (not shown in FIG. 1A) and a beam of ultrasound propagating in the liquid (beam not shown in FIGS. 1A–1B) is directed towards the sensor 10 in the general direction represented by the approximate direction of the arrow 7 (FIG. 1A), part of the ultrasonic waves may be reflected by the reflective surface 2A. This part is referred to as the first reflected wave. Similarly, a portion of the ultrasonic waves reaching the reflective surface 2B of the movable member 2E may be reflected by the reflective surface 2B. The part reflected from the surface 2B is referred to as the second reflected wave.

It is noted that most of the energy of the ultrasound waves reaching the surfaces 2A and 2B is reflected back while only a relatively small fraction of the energy will propagate through the walls of the housing 2 and through the movable member 2E to reach the back wall 2F of the housing 2. This is so because the acoustic impedance of the material from which the housing 2 is made (or is coated with) is significantly different than the acoustic impedance of the gas or gas mixture enclosed within the cavity 5. Therefore, the intensity of any additional ultrasound waves reflected from the back wall 2F is low compared to the intensity of the waves reflected from surfaces 2A and 2B.

If the phase of the ultrasonic waves reflected from the surface 2A is not identical to the phase of the ultrasonic waves reflected from the surface 2B, interference may occur. For any given frequency of ultrasound (or other acoustic waves, if used), the phase difference at the plane of the surface 2A between waves reflected from the surface 2A and the waves reflected from the surface 2B depends, inter alia, on the distance D and on the frequency f of ultrasonic (or acoustic) radiation. For a fixed value of the distance D for some ultrasound (or acoustic) frequencies, the waves reflected from the surfaces 2A and 2B may interfere destructively and for other ultrasound (or acoustic) frequencies the waves may interfere constructively.

When an ultrasound beam directed towards the sensor 10 comprises waves having a plurality of frequencies in the ultrasound range, if an ultrasound receiver (not shown in FIG. 1A) is positioned in a position suitable for receiving the ultrasonic waves reflected back from the sensor 10, the reflected ultrasonic waves at some frequencies may have a lower intensity due to destructive interference. For a particular sensor and a stimulating ultrasound beam having a particular frequency range, there will be one or more frequencies of ultrasound which will have the maximal attenuation of the reflected waves due to destructive interference and at these one or more frequencies the reflected waves will therefore have the least intensity. These maximal attenuation frequencies may be easily determined by suitable processing of the signal representing the reflected waves received by the receiver. For example, computing the Fourier transform of the received signal and presenting the data as a curve in the frequency domain will show a notch or dip in the curve representing the intensity of the received signal as a function of frequency, with minimum points at the maximal attenuation frequency or frequencies.

It is noted that, as a first approximation, for ultrasound beam incidence which is perpendicular to the reflecting surfaces 2A and 2B, the intensity of the first reflected wave (the wave initially reflected from the surface 2A) may depend, inter alia, on the intensity of the incident ultrasound wave directed towards the sensor 10, on the acoustic impedance of the fluid (not shown) in which the sensor 10 is immersed, on the area of the surface 2A, and on the acoustic impedance of the material (or materials) from which the housing 2 is made. The intensity of the second reflected wave may depend, inter alia, on the intensity of the incident wave directed towards the sensor 30, the area of the surface 2B, the acoustic impedance of the fluid within which the sensor 10 is immersed, the acoustic impedance of the material or materials from which the movable member 2B is made.

Thus, the sensor 10 may have to be configured by suitably selecting some or all of the above indicated sensor parameters to ensure that the second reflected wave has a sufficient intensity to cause a measurable attenuation in one or more frequencies in the returning acoustic signal reflected back from the sensor 10.

Moreover, the parameters and structure of the sensor 10 may preferably be selected, such that the intensity of the first reflected wave is approximately similar to or equal to the intensity of the second reflected wave to improve the sensor's performance. This may be achieved, inter alia, by suitably selecting the material or materials included in or forming the movable member 2B and the wall of the housing 2 underlying the reflecting surface 2A, and the dimensions of the effective reflecting surfaces 2A and 2B.

Since the maximal attenuation frequencies depend on the distance D and the distance D is a function of the pressure PX in the liquid in which the sensor 10 is immersed, the maximal attenuation frequencies are also a function of the pressure PX. The pressure PX in the liquid in which the sensor 10 is immersed may therefore be determined from the maximal attenuation frequency or frequencies.

Changes in the pressure PX within the liquid in which the sensor 10 is immersed will result is a detectable shift in the determined maximal attenuation frequencies. Thus, dynamic changes in PX may be determined by determining the changes in one or more of the maximal attenuation frequencies.

It is noted that while the sensor 10 is, preferably, shaped as a recessed cylinder and has a circular cross section, this is by no means obligatory. Thus, the sensors of the present invention may also have a rectangular cross section or a hexagonal cross section, or other suitable polygonal cross-section, or any other suitable cross section, or may be shaped in any other suitable shape.

It is further noted that the dimensions of the sensor 10 may depend, inter alia, on the frequency range of the ultrasonic (or sonic) radiation used. For micro-miniature sensors, acoustic waves may be used in the frequency range of a few kilohertz (KHz) to 50 megahertz (MHz). Other, different, acoustic frequencies outside this frequency range may, however, also be used, depending, inter alia, on the physical sensor dimensions.

Typically, in accordance with one possible embodiment of the invention, the distance D between the two spaced apart reflective surfaces (such as but not limited to the exemplary surfaces 2A and 2B of the sensor 10 of FIG. 1A) may be in the range of 10–2000 micrometers. In this range of values of D, small changes on the order of a few tenths of nanometers to a few micrometers in the distance separating the surfaces 2A and 2B may result in measurable changes in the maximal attenuation frequency (or frequencies) of the sensor. It is, however, noted that while these numbers may relate to small sensors for use with ultrasonic frequencies, other different sensors may be constructed and operated using frequencies of sound other than ultrasound frequencies (such as, but not limited to, frequencies in the audio frequency range) in which case the sensor's physical parameters and dimensions may be adapted to effectively operate in the chosen frequency range. It will be appreciated by those skilled in the art that the devices, systems and methods disclosed herein may be adapted for operating in any desired frequency range, depending, inter alia, on the application, the physical parameters to be measured (pressure, osmotic pressure, or the like) and the allowable or desired sensor size. Thus, the methods, sensors and systems of the present invention may be implemented using any suitable acoustic waves, including sound waves and ultrasound waves.

Figure 2:
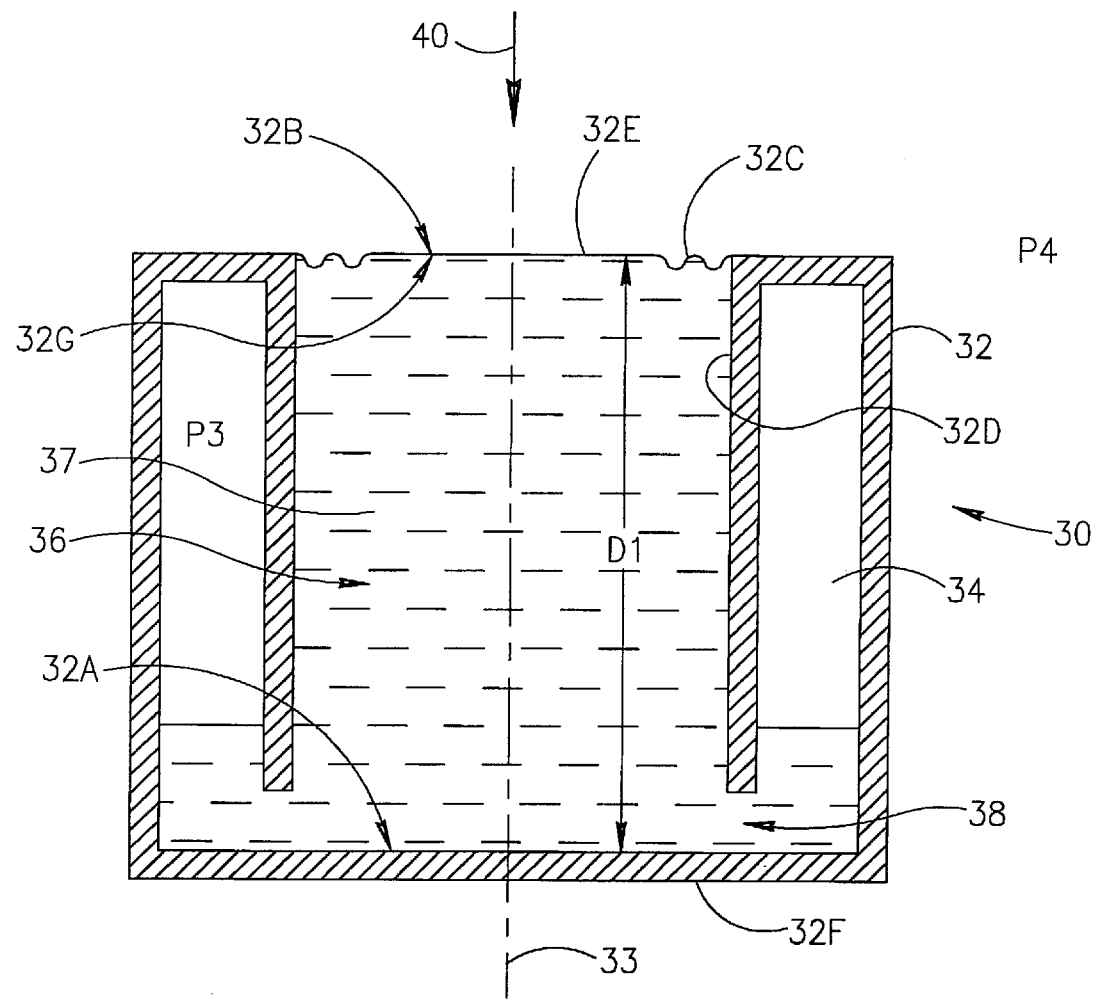
FIG. 2 is a schematic cross-sectional view, illustrating a passive ultrasonic pressure sensor constructed in accordance with another embodiment of the present invention.

Reference is now made to FIG. 2 which is a schematic cross-sectional view, illustrating a passive ultrasonic pressure sensor constructed in accordance with another embodiment of the present invention.

The passive ultrasonic sensor 30 of FIG. 2 may include a cylindrical housing 32 having a longitudinal axis 33. The housing 32 may have two chambers 34 and 36 therein. The chambers 34 and 36 are in fluidic communication with each other through one or more openings 38. The housing 32 includes a back wall 32F. The back wall 32F has a reflective surface 32A which is capable of reflecting acoustic waves (such as, for example, sonic waves and ultrasonic waves). The sensor 30 may include a movable member 32E having a reflective surface 32B capable of reflecting acoustic waves. The movable member 32E may be sealingly and movably attached to the walls 32D forming the chamber 36 by a flexible corrugated member 32C. The flexible member 32C is shaped such that the movable member 32E may be moved if a force is applied thereto. The reflective surface 32B of the movable member 32E may be thus moved to different positions along the longitudinal axis 33. The sensor 30 is a sealed sensor. The chamber 36 and part of the chamber 34 may be filled with a fluid 37. The fluid 37 may be water, or any other suitable fluid through which ultrasound (or other suitable acoustic waves, if used) may propagate. The chamber 34 may also contain a gas or a gas mixture such as air or nitrogen or argon, or any other suitable gas or gas mixture known in the art.

The entire sensor 30 may be immersed in a fluid or liquid for performing a measurement (the fluid in which the sensor 30 may be immersed is not shown for the sake of clarity of illustration). The pressure of the gas or gas mixture contained within the chamber 34 may have a value P3. The pressure within the medium of fluid in which the sensor 30 is immersed may be P4. If P4 is larger than P3, a net force acts on the movable member 32E which may push the member 32E in a direction towards the back wall 32F of the sensor 30, shortening the distance D1 separating the surface 32B from the surface 32A. The movement of the movable member 32E towards the surface 32A may push some of the liquid 37 through the opening or openings 38 into the chamber 34 which may compress the gas or gases (not shown) contained in the chamber 34 and the pressure within the chamber 34 may increase until equilibrium is established and the member 32E stops moving.

If P4 is smaller than P3, a net force acts on the movable member 32E which may push the member 32E in a direction away from the back wall 32F of the sensor 30, increasing the distance D1 separating the surface 32B from the surface 32A. The higher pressure P3 will push some of the fluid 37 back into the chamber 36 pushing the movable member 32E away from the surface 32A until the forces acting on the movable member 32E equalize.

Thus, when the pressure outside the sensor 30 is varied, the position of the movable member 32E may change and the distance D1 between the plane of the reflective surface 32A and the plane of the reflective surface 32B may change. For example, if the outside pressure P4 increases, the distance D1 will decrease as the movable member 32E moves towards the plane of the reflective surface 32A. Similarly, if the outside pressure P4 decreases, the distance D1 will increase as the movable member 32E moves away from the plane of the reflective surface 32A. Thus, the distance D1 between the plane of the reflective surface 32A and the plane of the reflective surface 32B is a function of the pressure P4 outside the sensor 30.

When the sensor 30 is immersed in a liquid (not shown in FIG. 2) and a beam of ultrasound propagating in the liquid (beam not shown in FIG. 2) is directed towards the sensor 30 in the general direction represented by the arrow 40 (FIG. 2), part of the ultrasonic waves may be reflected by the reflective surface 32E in a direction generally opposite the direction of the arrow labeled 40. This reflected wave may be termed the first reflected wave. Another part of the ultrasonic waves will propagate through the member 32E and through the fluid 37 and reach the reflecting surface 32A of the back wall 32F. Out of the portion of the ultrasound waves reaching the surface 32A, a portion is reflected by the surface 32A through the fluid 37, and reaches the surface 32G of the movable member 32E.

A portion of the reflected waves reaching the surface 32G will propagate through the movable member 32E and exit at the surface 32B to propagate in the fluid (not shown) within which the sensor 30 is immersed in a direction opposed to that of the original beam of ultrasound which was directed towards the sensor 30. This portion may be termed herein as the second reflected wave.

The first reflected wave and the second reflected wave may interfere as disclosed hereinabove due to phase differences between the first reflected wave and the second reflected wave resulting from different propagation paths. The interference may be destructive or constructive, as disclosed hereinabove for the sensor 10. Since the distance D1 depends, inter alia, on the pressure within the fluid in which the sensor 30 is immersed, and since for the same value of the distance D1 different frequencies of ultrasound may result in different interference, the maximal extinction frequency (or frequencies) for the ultrasound waves reflected by the sensor 30 may be a function of the pressure P4 in the fluid surrounding the sensor 30.

It is noted that, as a first approximation, for ultrasound beam incidence which is perpendicular to the reflecting surface 32B, the intensity of the first reflected wave (the wave initially reflected from the surface 32B) may depend, inter alia, on the intensity of the incident ultrasound wave directed towards the sensor 30, on the acoustic impedance of the fluid (not shown) in which the sensor 30 is immersed, on the area of the surface 32B, and on the acoustic impedance of the material (or materials) from which the movable member 32E is made. The intensity of the second reflected wave (the wave which penetrated the fluid 37, was reflected from the surface 32A, and passed through the fluid 37 and the movable member 32E to exit the surface 32B in a direction opposite the general direction of the arrow 40) may depend, inter alia, on the intensity of the incident wave directed towards the sensor 30, the area of the portion of the surface 32A which is circumscribed by the walls 32D of the chamber 36, the acoustic impedance of the fluid 37 included within the sensor 30, the thickness of the movable member 32E, the acoustic impedance of the material or materials from which the movable member 32E is made, the distance D1, and the acoustic impedance of the fluid (not shown) in which the sensor 30 is immersed.

Thus, the sensor 30 may have to be configured by suitably selecting some or all of the above indicated sensor parameters to ensure that the second reflected wave has a sufficient intensity to cause a measurable reflected wave attenuation.

Moreover, the parameters and structure of the sensor 30 may preferably be selected, such that the intensity of the first reflected wave is approximately similar to the intensity of the second reflected wave to improve the sensor's performance. This may be achieved, inter alia, by suitably selecting the material or materials included in or forming the movable member 32E and the back wall 32F, the thickness of the movable member 32E and of the back wall 32F, the composition and acoustic impedance of the fluid 37, and the dimensions of the effective reflecting surface 32B and of the effective reflecting surface area of the portion of the surface 32A which is circumscribed by the walls 32D of the chamber 36.

It is noted that the sensor 10 (FIG. 1) and the sensor 30 (FIG. 2) may be used as absolute pressure sensors. These types of sensors may be calibrated before installation or implantation, by testing them under a variety of pressures and temperatures to establish appropriate calibration curves or calibration data for correlating the maximal attenuation frequency with the pressure value under these different conditions. Once the sensors are positioned or implanted at the site at which the pressure needs to be measured, the absolute pressure at the measurement site may be determined or computed from such calibration data or calibration curves.

It is further noted that in accordance with another embodiment of the present invention, it is also possible to construct sensors which measure the differential pressure at a measurement site.

Figure 3:
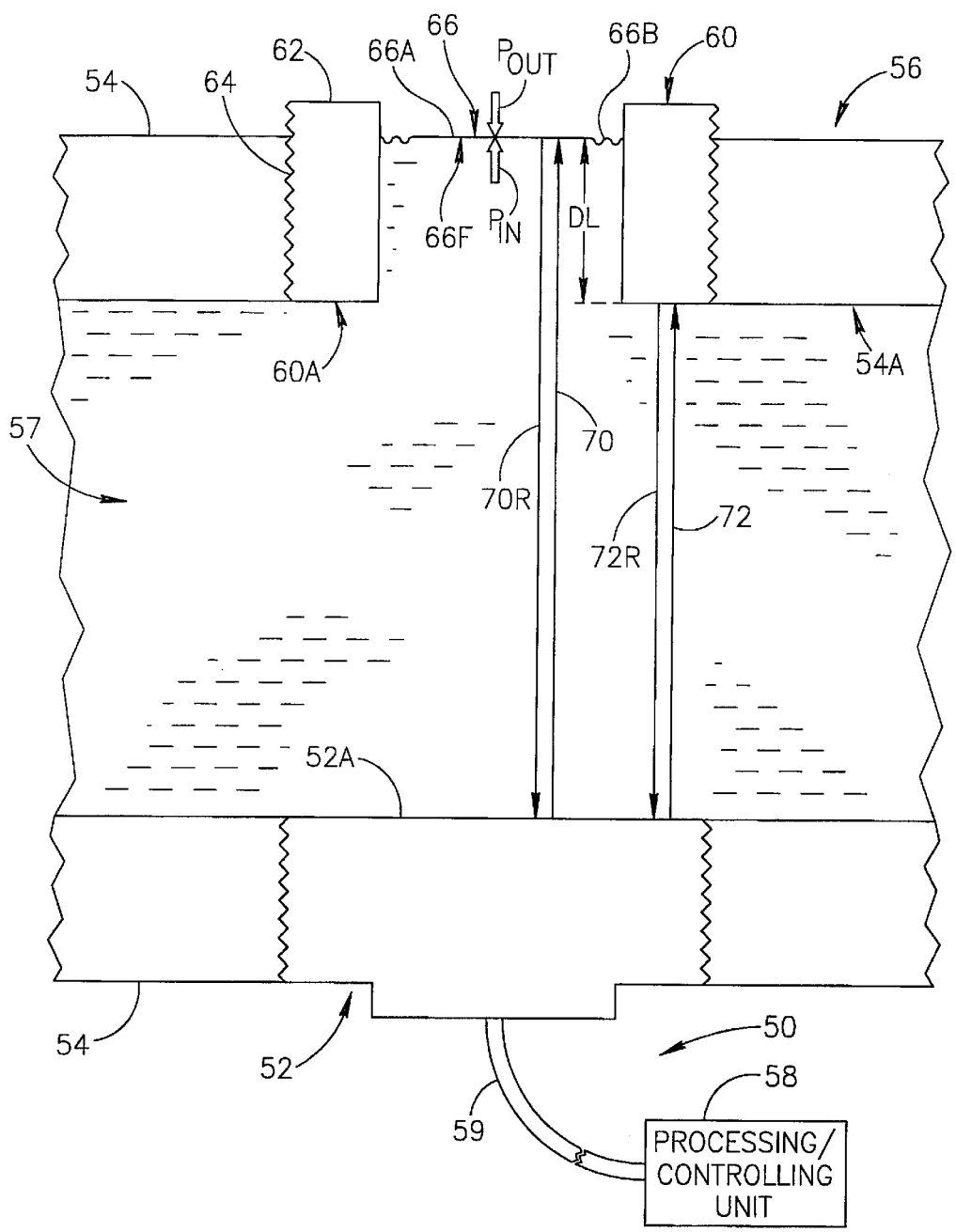
FIG. 3 is a schematic cross sectional view of part of a pressure measuring system for differential pressure measurement, in accordance with another preferred embodiment of the present invention.

Reference is now made to FIG. 3 which is a schematic cross sectional view of part of a pressure measuring system for differential pressure measurement, in accordance with another preferred embodiment of the present invention.

The system 50 may include an ultrasonic transducer 52 suitably mounted or attached to the wall 54 of a vessel 56. The vessel 56 may be a container or a reactor, or pipe, or tube, or the like. The vessel 56 may contain a fluid 57. The fluid 57 may be a liquid or a gas or a gas mixture or any other fluid known in the art. The system 50 may further include a processing/controlling unit 58. The processing/controlling unit 58 may be suitably connected to the ultrasonic transducer 52 by a suitable cable 59, or by any other suitable connecting means known in the art, for controlling the operation of the transducer 52 and for sending various signals to the transducer 52 and receiving various signals from the transducer 52.

The system 50 may further include a passive ultrasonic sensor 60 suitably attached to or mounted within the walls 54 of the vessel 56 opposite the ultrasonic sensor 52. The sensor 60 may include a threaded cylindrical housing 62 sealingly screwed within a threaded opening 64 passing through the vessel wall 54. The sensor 60 may further include a movable member 66. The movable member may be a thin circular member having a flat circular part 66A and a corrugated flexible part 66B.

The movable member 66 may be sealingly attached to the housing 62 by any suitable attachment method or material known in the art, such as by a suitable glue or adhesive or welding or the like. Alternatively, the sensor 60 may be formed such that the movable member 66 and the housing 60 are formed as a single contiguous unit, such as for example by forming the sensor 60 from a plastic material using a casting or a molding, or an embossing method, as is known in the art. Other suitable forming methods may also be used.

The housing 60 has a fixed (non-moving) reflecting surface 60A. The flat circular part 66A of the movable member 66 has a reflective surface 66F. The pressure outside the vessel 56 is schematically represented by the arrow labeled $P_{OUT}$. The pressure of the fluid 57 disposed in the vessel 56 is schematically represented by the arrow labeled $P_{IN}$. Due to the flexibility of the corrugated part 66B of the movable member 66, the distance DL between the surface 66F and the plane of the surface 60A depends, inter alia, on the pressure difference $\Delta P = P_{IN} - P_{OUT}$. Thus, DL is a function of the difference in the pressure inside and outside the vessel 56.

When the transducer 52 is energized by the processor/controller unit 58, ultrasonic waves schematically represented by the arrows 70 and 72 propagate within the fluid 57 and are directed towards the reflecting surfaces 66F and 60A, respectively. A portion of the ultrasonic waves 70 reaching the surface 66F is reflected back towards the surface 52A of the transducer 52. This reflected portion is schematically represented by the arrow labeled 70R. A portion of the ultrasonic waves 72 reaching the surface 60A (and, possibly, a portion of the surface 54A of the walls 54) is reflected back towards the surface 52A of the transducer 52. This reflected portion is schematically represented by the arrow labeled 72R.

If the ultrasonic transducer 52 is a piezoelectric transducer, the reflected ultrasonic waves reaching the surface 52A may be detected by the transducer 52 to form an electrical signal representing the reflected ultrasonic waves. This signal may be communicated to the processing/controlling unit 58 for further processing as disclosed in detail hereinafter.

The difference in the path length traversed by the reflected waves 70R and the reflected waves 72R is 2DL. The reflected waves 70R and 72R may interfere constructively or destructively as disclosed in detail hereinabove, depending, inter alia, on the phase difference between the reflected waves 70R and 72R frequency. This phase difference depends on the frequency of the ultrasonic wave. Therefore, since DL is a function of $\Delta P$ and the intensity of the reflected ultrasonic waves received by the transducer 52 depends, inter alia, on the frequency of ultrasound, the maximal attenuation frequency of the reflected ultrasound is a function of the pressure difference $\Delta P$. Thus, $\Delta P$ may be determined from the maximal attenuation frequency of the of the reflected ultrasound.

It is noted that in cases in which the useful parameter is the difference $P_{IN} - P_{OUT}$, the value of the pressure difference $\Delta P$ may be reported and used directly. Alternatively, if the value of $P_{OUT}$ is independently known (such as, for example, by using a different sensor placed outside the vessel 56 to determine the pressure $P_{OUT}$ outside of the vessel 56), the value of $P_{IN}$ may be computed from the measured values of $P_{OUT}$ and $\Delta P$.

It is noted that, preferably, the ultrasound beam directed from the transducer 52 towards the sensor 60 is a narrow beam such that the energy of the waves reflected from the surface 60A (and possibly from a portion of the surface 54A of the wall 54, as disclosed hereinabove) is not excessively large compared to the energy of the waves reflected from the surface 66F. The ultrasonic beam width may thus be adjusted to ensure a satisfactory frequency dependence of the attenuation of the reflected ultrasound intensity.

Among the advantages of the system 50 is that the sensor 60 may be adapted to withstand harsh conditions such as for example extreme pH values or temperatures or corrosive properties of the fluid 57 by using suitable materials to construct the sensor 60 and/or the transducer 52 or their parts which are in contact with the fluid 57.

It is noted that while the sensors 30 and 60 of FIGS. 2 and 3, respectively, may be cylindrical sensors having a circular cross section, it may be possible to construct other embodiments of such sensors which have other different shapes and cross-section, as disclosed hereinabove in detail for the sensor 10 of FIG. 1A. Similarly, the transducer 52 (FIG. 3) may have any suitable shape known in the art and may have a circular cross section or a rectangular cross section or a polygonal cross section or any other suitable shape or geometry known in the art.

Figure 4:
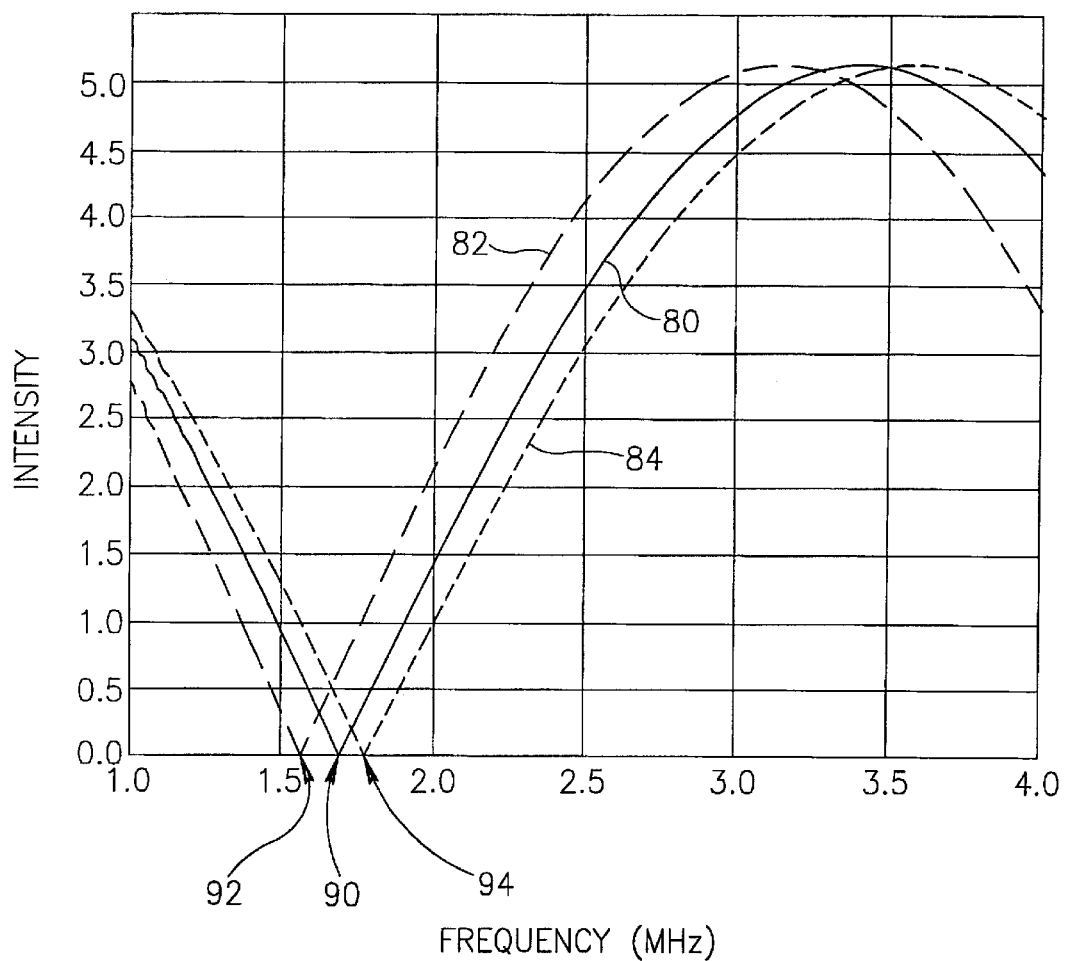
FIG. 4 which is a schematic graph illustrating the results of a simulation demonstrating the dependence of the maximal attenuation frequency of reflected ultrasound on the distance between two parallel spaced apart reflecting surfaces of a sensor.

Reference is now made to FIG. 4 which is a schematic graph illustrating the results of a simulation demonstrating the dependence of the maximal attenuation frequency of reflected ultrasound on the distance between two parallel spaced apart reflecting surfaces.

The simulation was mathematically performed using MATLAB (version 6.1) software. The two reflective surfaces of the simulated sensor were assumed to have an equal area and the starting distance between the reflective surfaces was 220 micrometers. The incident ultrasound wave was assumed to comprise a short broadband ultrasound pulse. The simulated reflected signal was calculated assuming that the first reflected wave and the second reflected wave have the same intensity, and a fast Fourier transform (FFT) was performed on the time domain reflected signal. The graph of FIG. 4 is a frequency domain presentation of the FFT of the simulated reflected ultrasound. The vertical axis of the graph represents the reflected ultrasound intensity (in arbitrary units) and the horizontal axis of the graph represents the ultrasound frequency in megahertz (MHz).

The graph of FIG. 4 includes three curves 80, 82, and 84. The curve 80 represents the FFT results for a distance of 225 micrometers between the reflecting surfaces of the sensor. The curve 82 represents the FFT results for a distance of 205 micrometers between the reflecting surfaces of the sensor. The curve 84 represents the FFT results for a distance of 245 micrometers between the reflecting surfaces of the sensor. Turning to the curve 80 it can be seen that within the simulated frequency range of 1–4 MHz, the reflected signal has a minimal intensity (visually discernible as a "notch" in the curve 80) point at an ultrasound frequency of approximately 1.7 MHz (this frequency is marked on the frequency axis by the arrow 90). This frequency is the maximal attenuation frequency (within the shown frequency range of 1–4 MHz) for a distance of 225 micrometers between the reflecting surfaces of the simulated sensor. In curve 82 when the distance between the reflecting surfaces is reduced to 205 micrometers, the maximal attenuation frequency (within the shown frequency range of 1–4 MHz) is shifted to approximately 1.57 MHz (as is marked on the frequency axis by the arrow 92). In curve 84 when the distance between the reflecting surfaces is increased to 245 micrometers, the frequency of maximal attenuation (within the shown frequency range of 1–4 MHz) is shifted to approximately 1.75 MHz (as is marked on the frequency axis by the arrow 94). The simulation thus shows a dependency between the maximal attenuation frequency of the reflected wave (within the shown frequency range of 1–4 MHz) and the distance separating the two reflecting surfaces of a sensor.

It is noted that while the graph of FIG. 4 illustrates a limited frequency range of 1–4 MHz for the purpose of clarity of illustration, if one performs the simulation for a larger frequency range, additional intensity minima (which may be discerned as notches in the intensity versus frequency curves of the frequency domain data) may be observed at frequencies which may be multiples of a basic frequency. For example, if the FFT of the simulated reflected signal is computed for the frequency range of 1–6 MHz, another intensity minimum (not shown) may be observed at a frequency of approximately 5.1 MHz. Similarly, other intensity minima may be found at 8.5 MHz, 11.9 MHz etc. (at whole multiples of 3.4 MHz).

It is, however, noted that for a real sensor immersed in a real liquid or fluid, the intensity of the reflected signal may diminish at higher frequencies due to higher attenuation of higher frequency waves by the medium through which the waves propagate.

Nevertheless, when the transmitted broadband signal is of a sufficient intensity, it may be practically possible to determine more than one frequency minimum by suitably analyzing the signal reflected from the sensor. These multiple minima points may all be similarly shifted on the frequency axis as the distance between the first and second reflecting surfaces changes.

It is noted that if multiple frequency minima may be detected in the processed reflected signal, this may constitute a reflected signal "signature" which may facilitate identification of the reflected signal in the presence of spurious signals or noise present in the received signal due to echoes or reflections from tissues or other reflective structures interposed between the sensor and the transducer emitting the interrogating acoustic waves.

Figure 5:
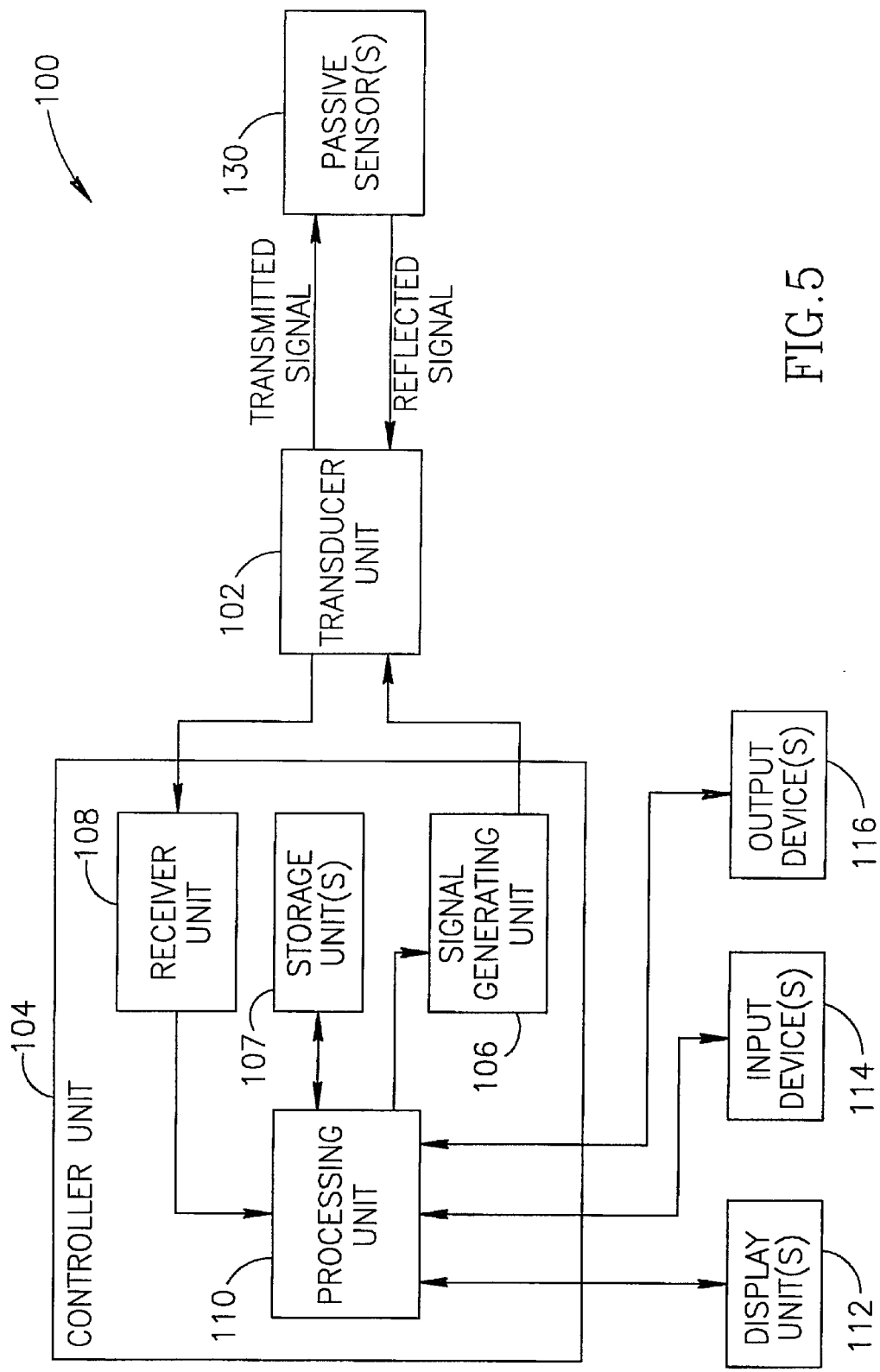
FIG. 5 is a schematic block diagram illustrating the components of a system including passive ultrasonic sensors for pressure measurement, in accordance with an embodiment of the present invention.

Reference is now made to FIG. 5 which is a schematic block diagram illustrating the components of a system including passive ultrasonic sensors for pressure measurement, in accordance with an embodiment of the present invention.

The system 100 may include a transducer unit 102, one or more passive sensors 130 and a controller unit 104. The transducer unit 102 may, preferably, be any suitable ultrasonic transducer for generating ultrasonic waves but may also be any suitable acoustic transducer for producing sound waves, depending, inter alia, on the application for which the system is designed and on the dimensions of the sensor(s) 130.

The transducer unit 102 is suitably connected to the controller unit 104. The controller unit 104 may include a signal generating unit 106, a receiver unit 108, and a processing unit 110. The signal generating unit 106 may be suitably coupled to the transducer, and may generate electrical signals for energizing the transducer unit 102. For example, when the transducer unit 102 is an ultrasonic transducer including one or more piezoelectric elements (not shown), the signal generating unit 106 may include circuitry suitable for generating ultrasonic frequency electrical signals which may be fed to the transducer unit 102 for generating ultrasonic waves. The ultrasonic waves generated by the transducer unit 102 may be continuous, pulsed, or chirped ultrasonic waves, as is known in the art.

The transducer unit 102 may also be suitably connected or coupled to a receiver unit which may receive electrical signals from piezoelectric elements (not shown) included in the transducer unit 102. Thus, the transducer unit 102 or parts thereof (such as, for example, piezoelectric elements included in the transducer unit 102) may sense the ultrasonic waves which may be reflected by the passive sensor 130 after the passive sensor(s) 130 is (are) irradiated by an ultrasonic wave or beam emitted from the transducer unit 102. The sensed reflected ultrasonic wave may be converted to an electrical signal by one or more of the piezoelectric elements included in the transducer unit 102, and the signals may be fed to the receiver unit 108. The receiver unit 108 may include amplifying circuitry (not shown) for amplification of the received electrical signals and may also include conditioning circuitry, such as impedance matching circuitry (not shown in detail) and/or filtering circuitry (not shown in detail) for conditioning the received signal. The receiver unit 108 may also include digitizing circuitry (not shown) for digitizing the amplified analog signal. The structure and operation of receiver units such as the receiver unit 108 is well known in the art and is therefore not disclosed in detail hereinafter. The digitized signal at the output of the receiver unit 108 may be fed to the processing unit 110 for further processing.

The processing unit 110 may be suitably connected to the receiver unit 108 for receiving the digitized signal therefrom. The processing unit 110 may be suitably connected to the signal generating unit 106 for controlling the operation thereof. The processing unit 110 may be a microprocessor, or a micro-controller, or any other suitable type of processor or controller unit known in the art. The processor unit 110 may also be a computer or a suitable board or integrated circuit included in a computer, such as but not limited to a personal computer, a workstation, a minicomputer, a mainframe, a digital signal processor (DSP), or any other type of suitable computing device known in the art.

It is noted that the processing unit 110, the receiver unit 108 and the signal generating unit 106 may include digital circuitry, analog circuitry, hybrid analog/digital circuitry or combinations thereof. Thus, the processing unit may be a digital microprocessor, but may also be any suitable analog computing device. It is noted that some or all of the processing of the received analog signal (reflected from the sensor), may be performed using analog circuitry or analog components as is well known in the art of signal processing.

The processing unit 110 may (optionally) be suitably connected to one or more display units 112 for displaying data. The display unit(s) may be any type of display device known in the art and suitable for displaying graphical and/or, textual and/or symbolic information, such as but not limited to a cathode ray tube (CRT) display device, a liquid crystal display (LCD) device, a plasma display unit, or any other suitable display device(s) known in the art.

The processing unit 110 may (optionally) be suitably connected to one or more input devices 114, such as a keyboard, a mouse a light pen a touch-screen, or any other pointing device or input device known in the art, for input of data and/or control commands to the processing unit 110. The input device(s) 114 may thus be used to control the operation of the system 100, and may function as a user interface.

The processing unit 110 may (optionally) be suitably connected to one or more output devices 116, such as a printer, a chart recorder, or the like for providing a hardcopy record of the measurement results.

The processing unit 110 may (optionally) be suitably connected to one or more storage units 107 for storing therein and retrieving therefrom data and/or program instructions. The storage units 107 may include one or more storage devices or memory devices such as but not limited to random access memory (RAM), read only memory (ROM), FLASH memory units, magnetic storage devices, optical or opto-magnetic storage devices, holographic memory storage devices, or any other types of devices for permanent or temporary data and program storage which is known in the art. One or more of the storage units 107 may have fixed or removable magnetic storage media or optical storage media or magneto optical storage media, or the like.

It is noted that since the system 100 may include more than one passive sensor 130, the system may be used to perform pressure measurements at various different sites. This may be performed by placing different sensors at different locations in the measurement region and moving the transducer unit 102 to direct an ultrasound beam at a selected sensor for performing a pressure measurement at a first site. The transducer unit 102 may then be moved to direct the ultrasonic beam at another sensor located at a different site within the measurement region to perform a pressure measurement at the other site. Thus a plurality of sensors may be used for performing pressure measurement at different sites. Alternatively, if the transducer unit 102 is a transducer capable of producing a steered ultrasound beam, (such as, for example, in phased array transducer units as known in the art), the transducer unit 102 may be fixed in place and the beam may be directed towards a sensor selected from the plurality of sensors placed within the measurement region.

It is noted that in cases where a beam may be steered towards different selected sensors of a plurality of sensors, it may be desired to align the sensors such that when the beam is directed towards a selected sensor the major reflecting surfaces of the sensor are directed approximately normal to the beam direction. This may be necessary since the passive sensors disclosed herein may exhibit a sensitivity to the angle of incidence of the interrogating acoustic beam.

If the system 100 is operated with a single sensor 130, the transducer unit 102 may be fixed in place (such as, for example, the transducer 52 of the system 50 of FIG. 3). Alternatively, the transducer unit 102 may be movable, and may be manually positioned to irradiate the passive sensor for performing a measurement.

If the passive sensor is a miniature sensor implanted in a living organism or body, such as, for example, when the passive sensor is implanted within a lumen of a blood vessel or other body cavity, the transducer unit 102 may have to be manually placed in contact with the body in a position suitable for irradiating the implanted sensor with an ultrasound beam and receiving the reflected ultrasound wave to determine the pressure within the lumen or the body cavity.

In operation, the transducer unit 102 may produce a beam of ultrasound directed towards the passive sensor 130. The ultrasound wave may be continuous ultrasound wave or may be pulsed ultrasound, additionally, the ultrasound wave may be chirped such that the ultrasound frequency is swept across the range of frequencies used, as is known in the art.

If the transducer unit 102 is a broadband transducer, the transducer unit 102 may generate a short broadband ultrasonic pulse which contains a wide range of frequencies, as is known in the art. The pulse is propagated in the medium or fluid (not shown) in which the sensor 130 is surrounded and is reflected by the reflecting surfaces of the sensor as is disclosed in detail hereinabove. The reflected ultrasound signal may then be received by the transducer unit 102 and converted into a digitized electrical signal as disclosed hereinabove. The processing unit 110 may receive and store the digitized data on one or more of the storage devices 107 for further processing. The stored digitized signal may (optionally) be further processed by filtering as is known in the art to remove noise components. The data may then be further processed by performing a fast Fourier transform (FFT) on the data to generate FFT data representing of received power or intensity as a function of ultrasound frequency. This FFT data may have to be (optionally) further processed in order to correct for the frequency response characteristics of the specific type of transducer used to implement the transducer unit 102 to generate corrected FFT data.

The raw FFT data or the corrected FFT data may be further processed to determine the maximal attenuation frequency, as disclosed hereinabove. Program code for finding extremum (maximum or minimum) points in a set of data points is well known in the art and is therefore not disclosed in detail hereinafter.

The maximal attenuation frequency (or frequencies) may then be used to compute the pressure in the region of the sensor 130. For example, the computation may be performed by using a look up table (LUT). Such an LUT may include a set of different values of maximal attenuation frequency associated with a corresponding set of pressure values. The values in the LUT may be obtained by calibration experiments conducted for the specific sensor 130 which is being used and the particular transducer unit 102. Other known methods for determining the pressure from the maximal attenuation frequency may be used such as but not limited to manual or computer automated use of calibration curves, or the like.

If the sensor 130 is a sensor for measuring a pressure difference, such as for example the sensor 60 of FIG. 3, the differential pressure may be determined using a LUT as disclosed hereinabove or using any of the above disclosed methods. If data of the external pressure outside the sensor is available, the absolute pressure may be computed if desired from the values of the pressure difference and the external pressure.

Furthermore, since the measured maximal attenuation frequency may depend, inter alia, on the temperature, a correction for temperature may be applied if suitable calibration curve data for different temperature values is available and if the sensor's temperature is known by independently measuring the temperature in the measurement region using a suitable temperature sensor (not shown).

It is noted that the present invention may be implemented using a broadband ultrasonic transducer to direct short broadband pulses at the sensor 130. Other types of ultrasonic transducers and forms ultrasonic radiation may also be used. For example, a continuous broadband ultrasonic wave may be used. Additionally, a chirped ultrasound pulse may be used which scans the frequency range by increasing or decreasing the frequency of the emitted ultrasound with time.

It is noted that the signal processing methods for processing the ultrasonic signal reflected from the sensor 130 are not limited to the methods disclosed hereinabove, and that other methods known in the art may also be used. For example, the frequency domain analysis is not limited to FFT methods and other methods known in the art may be used, such as but not limited to various different wavelet transform (WT) methods, or the like.

In principle, any method which may be used to determine the maximal attenuation frequency from the time domain ultrasound signal reflected from the sensor 130 may be used in the present invention.

It is noted that the walls and other components of the housing passive sensors of the present invention (including but not limited to the sensors 10, 30, 60 and 130 of FIGS. 1A–1B, 2, 3, and 5, respectively) may be made of, or may include, a material having a suitable acoustic impedance. For example the walls of the housing 2 of the sensor 10 may be made of or may include, inter alia, silicon, boron nitride, glass, plastic, metals, metallic alloys, ceramic materials, such as but not limited to alumina, or other sintered materials, or the like.

Additionally, all or parts of the sensors 10, 30, 60 and 130 may include multi layered structures or composite structures, or may be coated or plated by additional layers of material. For example, the housing 2 of the sensor 10 may be made from plastic such as for example polytetrafluoroethylene (PTFE), plyethylene (PE), polypropylene (PP), or the like, but may be partially or entirely metalized or coated or plated with a metal layer (such as, but not limited to, gold, platinum, titanium, or the like) for improving the reflectivity of certain reflecting surfaces. Additionally, when the used sensor is an implantable sensor designed to be implanted within a living organism, or body, the sensor, or any part or parts thereof may be coated with one or more additional layers of a biocompatible material (such as, for example Parylene C®, or other suitable biocompatible materials known in the art). Furthermore, the sensors of the present invention or parts thereof, may be formed from such biocompatible materials such as but not limited to Parylene C®, by forming the entire sensor or a part thereof from such biocompatible materials using, inter alia, suitable forming methods such as injection molding, or casting, or the like.

It is noted that while all the sensors disclosed hereinabove and illustrated in FIGS. 1–3 have a static (fixed) reflective surface and a movable member having a moving reflective surface, it may be possible to construct sensors having two parallel moving members (not shown) opposing each other. Each of the two moving members has a reflecting surface. A suitable fluid may be disposed between these moving members. This type of sensor may include a chamber enclosing a compressible gas or a compressible mixture of gases, such that when the pressure outside the sensor varies the gas may expand or become compressed to allow movement of the movable members. These sensors may be constructed such that the distance between the two moving reflective surfaces varies as a function of the pressure outside the sensor. Such sensors may function similar to the functioning of the sensors disclosed hereinabove and are considered to be within the scope and spirit of the present invention. Such sensors may be operated similar to the sensors disclosed hereinabove by directing a beam of ultrasound towards the sensor and sensing the reflected ultrasound signal as described for the sensors and systems disclosed hereinabove.

It is noted that while the sensors disclosed hereinabove are adapted for determining the pressure within the fluid or liquid in which the sensor is immersed, it may be possible to adapt the sensors and systems of the invention for determining other, different, physical parameters of interest.

For example, the sensor 30 of FIG. 2 may be adapted for measuring the osmotic pressure of a liquid in which it is immersed by making a few modifications to the sensor 30. This may be achieved by constructing the movable member 32E of the sensor or at least a part thereof from a material which is impermeable to the various solutes included in the liquid in which the sensor 30 is immersed but which is permeable to the fluid within which the sensor is immersed.

For example, if the sensor is an implantable sensor which is immersed in blood or interstitial fluid once it is implanted, the movable member may be made from cellophane or from any other suitable semi-permeable material which is permeable to water molecules while being impermeable to the various solutes present in the blood or interstitial fluid. In such a case, the fluid 37 included within the chamber 36 of the sensor 30 may be water or a solution of one or more solutes or substances in water having a pre-selected osmotic pressure. The solutes or substances which may be included or dissolved in the fluid 37 may preferably be solutes which cannot penetrate the semi-permeable membrane comprising the movable member 32E or part thereof.

If the osmotic pressure in the liquid (not shown) in which the sensor is immersed changes, water molecules will cross the semi-permeable material of the member 32E in a direction determined by the osmotic pressure gradient which was formed across the semi-permeable material. The passage of water molecules either out of the cavity 36 or into the cavity 36 may decrease or increase, respectively the volume of the liquid 37 within the sensor 30, causing the movable member 32E to move in the direction of the arrow 40, or in a direction opposite of the direction of the arrow 40, respectively, thus changing the distance D1 between the surface 32G and the surface 32A.

If water molecules exit the cavity 36 through the member 32E or part thereof, D1 decreases. If water molecules enter the cavity 36 through the member 32E or part thereof, D1 increases. Since the frequency or frequencies of the maximal attenuation of the reflected acoustic waves depend on the distance D1, the osmotic pressure of the liquid in which the sensor is immersed may be determined from the received reflected acoustic signal similar to the way disclosed hereinabove for pressure determination.

It will be appreciated by those skilled in the art, that the movable member or a part thereof may comprise various different materials which may have selective permeability for different solvents, depending on the application. Thus, for various industrial applications, the composition and nature of the semi-permeable material comprising the movable member 32E or part thereof may be determined by the composition and nature of the solvent included in the liquid in which the sensor or at least a part thereof are immersed. Therefore, the composition of the movable member 32E and of the fluid 37 may be determined by the nature and composition of the liquid in which the osmotic pressure needs to be determined.

It is further noted that, in accordance with another embodiment of the present invention, one or more of the non-movable walls of the sensor 30 may be made from or may includes a semi-permeable material. For example, the wall 32F of the sensor 30 or a portion thereof may be made from a semi-permeable material such as, but not limited to, cellophane. When the sensor 30 is placed within a solution, the wall 32F or the portion thereof including the semi-permeable material may be in contact with the solution, and the osmotic pressure may be measured as disclosed hereinabove. It may also be possible to have embodiments in which both the movable member 32E and a wall of the housing 32 are made at least partly from or include a semi-permeable material.

Preferably, the semi-permeable material used in implementing such osmotic pressure sensitive sensors is a relatively rigid semi-permeable material to substantially reduce bending or distortion thereof due to internal pressure changes within the sealed chamber or chambers of the sensors (such as, for example, the chambers 34 and 36 of FIG. 2).

It is noted that the above disclosed method and sensors may be adapted to determine the osmotic pressure in no-aqueous liquids or fluids, such as for example, liquids comprising polar or non-polar organic solvents, or other non-aqueous solvents or solvent mixtures and one or more solutes.

The passive sensors and systems disclosed hereinabove are advantageous over wired sensors since they may allow the measurement of pressure within measurement regions which are difficult to access by regular wired sensors. In industrial applications, the sensors may be placed in corrosive or difficult to reach environments. Since the sensors are passive they do not need an internal power source for their operation nor do they need to be provided with power by wires or leads. The interrogation of the sensors of the present invention by ultrasound may be performed by manually held probes including ultrasonic or other acoustic transducers, or may be performed by fixed transducers, such as but not limited to the transducer 52 of FIG. 3.

Additionally, the passive ultrasonic sensors and systems of the present invention may be operated in environments in which wireless sensors based on electromagnetic wave transmission are difficult or impossible to use. For example, the sensors of the present application may be implanted within a blood vessel and used to determine the blood pressure within the blood vessel, while the use of sensors transmitting electromagnetic radiation such as radio waves may be severely limited in such electrically conducting environments.

Another advantage of the sensors of the present invention is that they may have a very small size (for example, in the sub-millimeter to millimeter range) which makes them suitable for implantation in a body or body space or body lumen, or other bodily cavities. The sensors and systems disclosed in the present application are advantageous since they may have a high sensitivity to the measured physical parameter (such as but not limited to pressure, or osmotic pressure as disclosed hereinabove), because a small change in the measured physical parameter may result in a large change in the frequency (or frequencies) of the reflected wave intensity minimum point or points.

It will be appreciated by the person skilled in the art, that the two acoustically reflecting surfaces of the sensors of the present invention (such as, for example, the pair of surfaces 2A and 2B of FIG. 1A, the pair of surfaces 32A and 32B of FIG. 2, and the pair of surfaces 60A and 66F of FIG. 3) should be substantially flat surfaces and should be substantially parallel surfaces. The reasons for this are, inter alia, that substantial deviations from flatness and/or the degree of parallelism of the surfaces may result in the effective introduction of a multiplicity of values of the distance between the reflecting surfaces in the same sensor, which may in turn lead to a multiplicity of phase differences of the interfering reflected waves (for each specific acoustic frequency within the range of frequencies included in the incident acoustic waves), resulting in broadening or smearing of the notches in frequency domain data curves representing the maximal attenuation frequency (or frequencies) and in general flattening of the frequency domain curves due to a decrease in the attenuation at or around the maximal attenuation frequency or frequencies. These changes may adversely affect the accuracy and sensitivity of the determination of the maximal attenuation frequency or frequencies.

Furthermore, the incident beam of acoustic waves directed at the sensor (s) of the present invention is preferably directed in a direction substantially perpendicular to the parallel acoustically reflecting surfaces of the sensor (such as, for example, the direction represented by the arrow 7 for the sensor 10 of FIG. 1A, the direction represented by the arrow 40 for the sensor 30 of FIG. 2, and the direction represented by the arrow 70 for the sensor 60 of FIG. 3). Substantial deviations of the direction of the incident beam from a direction perpendicular to the direction of the two acoustically reflecting surfaces may degrade the performance of the system using the sensors, and the accuracy and sensitivity of the measurements for reasons which may include, inter alia, an unequal degree of blocking of the incident acoustic waves from reaching the two different acoustically reflecting surfaces due to blocking and/or reflecting of the incident acoustic waves reaching one of the reflecting surfaces by the side walls of the sensors (such as, but not limited to, by the walls 2D of the sensor 10 of FIG. 1A, or by the walls 32D of the sensor 30 of FIG. 2), and the creation of a multiplicity of phase differences of the interfering reflected waves (for each specific acoustic frequency within the range of frequencies included in the incident acoustic waves) as disclosed in detail hereinabove for deviations from parallelism of the two acoustically reflecting surfaces.

It will be appreciated that the allowable degree of deviation from parallelism of the two acoustically reflecting surfaces used in the sensors of the present invention, may depend, inter alia, on one or more of the following factors: the specific frequency range of the incident acoustic radiation used, the distance between the two acoustically reflecting surfaces, the desired level of measurement sensitivity and accuracy, and other parameters of the sensor and the system used.

Similarly, the allowable degree of deviation from perpendicularity of the incident acoustic waves directed to the two acoustically reflecting surfaces used in the sensors of the present invention, may depend, inter alia, on one or more of the following factors: the specific frequency range of the incident acoustic radiation used, the distance between the two acoustically reflecting surfaces, the desired level of measurement sensitivity and accuracy, and other parameters of the sensor and the system used.

Similarly, the allowable degree of deviation from flatness of the two acoustically reflecting surfaces used in the sensors of the present invention, may depend, inter alia, on one or more of the following factors: the specific frequency range of the incident acoustic radiation used, the degree of scattering of incident acoustic waves by the acoustically reflecting surfaces at each specific frequency within the range of frequencies of the incident acoustic waves, the distance between the two acoustically reflecting surfaces, the desired level of measurement sensitivity and accuracy, and other parameters of the sensor and the system used.

Figure 6:
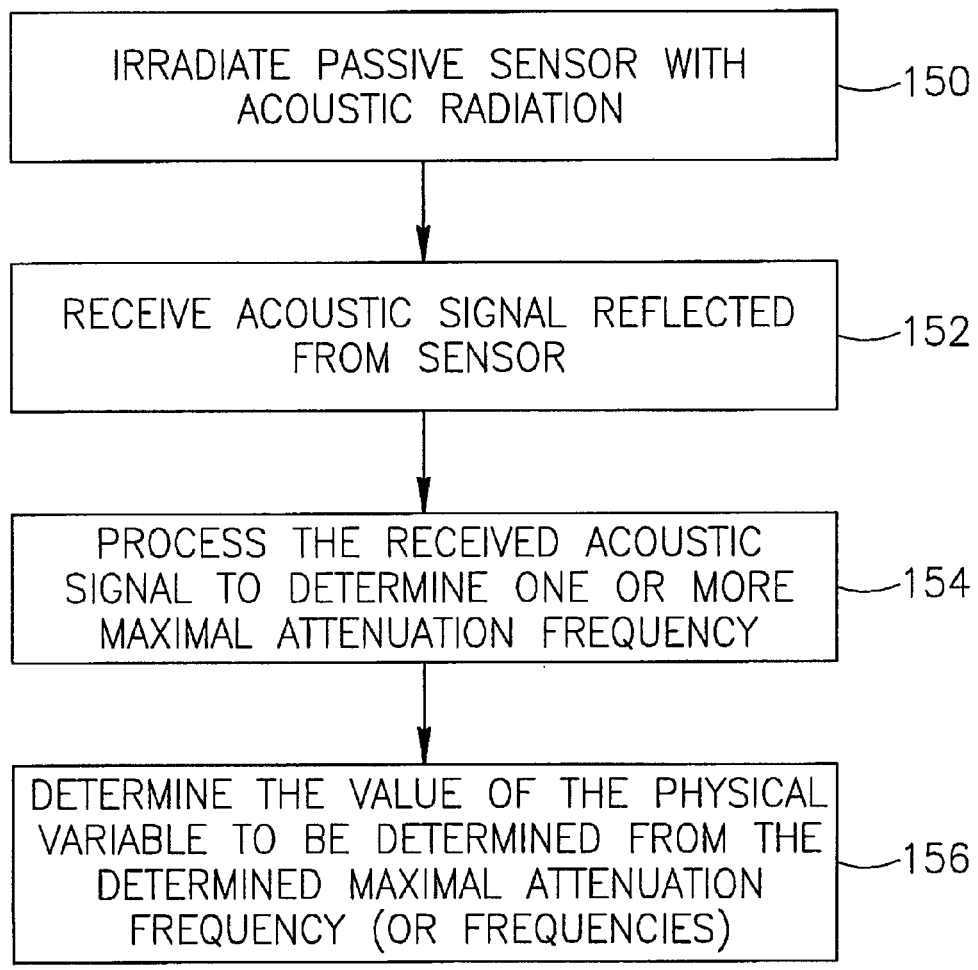
FIG. 6 is a schematic flow diagram illustrating the steps of a method for determining the value of a physical variable using one of the passive acoustic sensors of the present invention.

Reference is now made to FIG. 6 which is a schematic flow diagram illustrating the steps of a method for determining the value of a physical variable using one of the passive acoustic sensors of the present invention.

Prior to performing the measurements, the sensor or sensors are placed in the measurement region. For example, for miniature passive ultrasonic sensors, the sensor or sensors may be implanted within the body, in a body cavity (such as, for example, within a chamber of the heart), or in the lumen of a blood vessel, or subcutaneously, or in any other suitable part of a body of a patient in which pressure or osmotic pressure measurements are needed. In industrial, scientific or other applications, the passive sensor or sensors may be suitably installed in the measurement region by disposing, attaching or inserting the sensor or sensors within the measurement region.

If a system such as the system 59 of FIG. 3 is used, other parts of the system 50 may need to be installed prior to performing the measurements.

The passive sensor is irradiated with acoustic radiation (step 150). The acoustic radiation source may be any suitable acoustic radiation source known in the art. For example, the acoustic radiation source may be a transducer unit (such as, but not limited to, the transducer unit 52 of FIG. 3, the transducer unit 102 of FIG. 5, or any other suitable type of industrial or medical transducer known in the art). Thus, the acoustic radiation source may be any suitable type of sound transducer known in the art capable of producing sound waves. The acoustic radiation source may also be any suitable type of ultrasound transducer known in the art capable of producing ultrasonic waves. Preferably, for embodiments using ultrasonic passive sensors, the acoustic wave source is a piezoelectric transducer. Any other type of acoustic wave source may, however, be used to implement the invention, including but not limited to, electromechanical transducers, piezoelectric transducers, acoustic or ultrasonic piezoelectric arrays, or the like.

Preferably, but not obligatorily, the acoustic transducer (such as, but not limited to, the transducer 52 of FIG. 3 and the transducer unit 102 of FIG. 5) is of a type capable of producing a narrow beam of acoustic waves, and the beam cross section is adapted or suitably adjusted to minimize the generation of spurious signals in the form of echoes due to reflection by structures or tissues disposed near the sensor, or otherwise interposed between the transducer and the passive sensor. The acoustic waves may be continuous or pulsed, as disclosed in detail hereinabove. The acoustic waves may be broadband waves including wave frequencies within the frequency range required for performing the measurement, as disclosed hereinabove. The acoustic waves may also be chirped, such that the required frequency range is scanned or swept within a chirped pulse. The acoustic waves may also comprise a tone burst series including a group of pulses having different frequency ranges, as is well known in the art.

The beam parameters may be suitably controlled by the controller unit 104 (FIG. 5), or by the processing/controlling unit 58 (FIG. 3), or by any other suitable control means known in the art.

The acoustic waves are reflected from the reflecting surfaces of the sensor used, and may interfere, as disclosed in detail hereinabove. The acoustic signal reflected from the passive sensor (such as, but not limited to, the sensor 10 or 30 or 60, or 130) is received by the system (step 152). Preferably, the reflected acoustic signal is received and sensed by the same transducer that generated the acoustic waves directed towards the passive sensor (such as, for example, by the transducer 52 of FIG. 3, or the transducer 102 of FIG. 5).

It is noted, however, that the present invention may also be implemented by using an acoustic detector or sensor (not shown) which is separate from the transducer used to generate the acoustic waves directed at the passive sensor. Such a separate sensor or detector may be used for receiving or detecting the reflected acoustic signal returning from the passive sensor. In such a case, the reflected signal may be detected by any suitable acoustic sensor or receiver known in the art, such as, but not limited to, a microphone, a hydrophone, a piezoelectric sensor or microphone, or by any other suitable acoustic sensor or detector known in the art. In such a case, the acoustic wave source and the acoustic detector or sensor are preferably, but not obligatorily, coaxially arranged, as is known in the art, in order to best receive the acoustic waves reflected from the passive sensor. It is, however, noted that other, non-coaxial arrangements for separate acoustic wave source and acoustic sensor combinations may also be used as is known in the art.

The received reflected acoustic signal returning from the passive sensor is then processed to determine one or more maximal attenuation frequencies (step 154). Preferably, the signal representing the received returning acoustic wave is digitized as is known in the art and the digitized received signal is further processed using known methods of digital signal processing, as is known in the art and described in detail hereinabove, to detect one or more extremum frequencies at which the reflected signal intensity is maximally attenuated due to destructive interference of the acoustic waves reflected from the pair of acoustically reflecting surfaces.

It is, however, noted that the digitizing of the received signal is not mandatory and that the present invention may also be implemented by receiving and processing an analog signal. For example, if the transducer is a piezoelectric transducer, the analog electrical signal representing the received returning acoustic wave may be fed into suitable analog circuitry (not shown) which may perform all the necessary analog computations as is known in the art and output a signal representing one or more maximal attenuation frequencies. Furthermore, the receiving and processing of the returning reflected acoustic signal may also be performed by suitable hybrid (analog/digital or digital/analog) circuits (not shown), as is known in the art.

It is noted that the construction, structure, and methods operation of digital or analog or hybrid analog/digital electronic or other circuitry for receiving and processing acoustic signals as described in detail hereinabove are well known in the art, are not the subject matter of the present invention, and are therefore not described in detail hereinafter.

Finally, the value of the physical variable to be determined (such as, for example, the pressure or the osmotic pressure in the measurement region) may be determined from the obtained value or values of the maximal attenuation frequency, or maximal attenuation frequencies (step 156).

The value of the physical variable to be determined may be obtained using an LUT as disclosed hereinabove or by performing a computation using a suitable calibration curve parameters previously generated by calibrating the sensor. The value of the physical variable to be determined may be obtained as an absolute value, such as, for example, an absolute pressure value (by using a suitable calibration data or measurement) or as a relative value such as, for example, the difference of the pressure in the measurement region and the pressure in another region different than the measurement region.

The steps 150–156 disclosed hereinabove may be controlled and/or performed by the processing/controlling unit 58 (FIG. 3), or by the processing unit 110 of the controller unit 104 (FIG. 5). It is, however noted, that the control and data processing steps of the present invention are not intended to be limited by the exemplary configurations shown in FIGS. 3 and 5. Rather, many different types of control and processing device configurations may be implemented, which are all included within the scope of the present invention.

While the invention has been described with respect to a limited number of embodiments, it will be appreciated that many variations, modifications and other applications of the invention may be made which are within the scope and spirit of the invention.

What is claimed is:

1. A passive acoustic sensor for determining the value of a physical variable in a measurement region, the sensor comprising:
a housing having two spaced apart substantially parallel and substantially flat acoustically reflecting surfaces, at least one of said acoustically reflecting surfaces is a surface on a movable member configured to be movable with respect to said housing such that the distance between said acoustically reflecting surfaces varies as a function of said physical variable, said acoustically reflecting surfaces are configured such that when incident acoustic waves having a range of frequencies are directed at said sensor in a direction substantially orthogonal to said acoustically reflecting surfaces, a first portion of said incident waves is reflected from one of said acoustically reflecting surfaces to form a first reflected wave and a second portion of said incident waves is reflected from the remaining acoustically reflecting surface to form a second reflected wave, said first reflected wave and said second reflected wave interfere to form a returning acoustic signal having at least one maximally attenuated frequency which is correlated with the value of said physical variable in the measurement region in which said sensor is disposed.

2. The passive sensor according to claim 1 wherein one or more of the physical parameters of said sensor is selected such that the intensity of said first reflected wave is equal or substantially similar to the intensity of said second reflected wave.

3. The passive sensor according to claim 1 wherein one of said acoustically reflecting surfaces is a static surface of one of the walls of said housing.

4. The passive sensor according to claim 3 wherein said housing comprises an opening therein and a back wall opposing said opening, wherein at least a part of the surface of said back wall facing said opening is the second reflecting surface of said two acoustically reflecting surfaces, said movable member is sealingly attached to said opening to form a sealed chamber within said housing, wherein at least a portion of the surface of said movable member outside of said sealed chamber is the first reflecting surface of said two acoustically reflecting surfaces, said chamber has a fluid therewithin such that at least a first part of said chamber defined between said movable member and said second reflecting surface is filled with said fluid, and wherein said sealed chamber comprises at least a second part thereof, said second part of said sealed chamber is at least partially filled with a gas or a mixture of gases.

5. The passive sensor according to claim 4 wherein one or more of the physical parameters selected from the acoustic impedance of at least one component of said sensor, the thickness of said movable member, the area of the first reflecting surface of said two acoustically reflecting surfaces, the area of the second reflecting surface of said two acoustically reflecting surfaces, the acoustic impedance of the fluid within said sealed chamber, the distance between said movable member and said second reflecting surface, and any combinations thereof are selected such that the intensity of said first reflected wave is approximately equal to the intensity of said second reflected wave.

6. The passive sensor according to claim 5 wherein said at least one component of said sensor is selected from said movable membrane of a portion thereof, said back wall or a portion thereof, and the combination thereof.

7. The passive sensor according to claim 1 wherein one of said acoustically reflecting surfaces is a static surface of a wall of said housing, said housing has an open recess therein, said movable member is sealingly attached within said recess to form a sealed chamber within said housing, said chamber has a pressure level therein, and wherein said two acoustically reflecting surfaces are exposed on the external surface of said sensor for contacting a fluid within said region of measurement.

8. The passive sensor according to claim 7 wherein one or more of the parameters selected from the acoustic impedance of at least one component of said sensor, the area of the first reflecting surface of said two acoustically reflecting surfaces, the area of the second reflecting surface of said two acoustically reflecting surfaces, and any combinations thereof is selected such that the intensity of said first reflected wave is equal or substantially similar to the intensity of said second reflected wave.

9. The passive sensor according to claim 8 wherein said at least one component of said sensor is selected from said movable membrane of a portion thereof, and the wall of said housing underlying said static surface or a portion thereof, and the combination thereof.

10. The passive sensor according to claim 1 wherein said physical variable is the osmotic pressure in a first solution disposed in said measurement region, said housing has a second solution sealed therein, wherein at least one component of said sensor selected from one or more of the walls of said housing and said movable member comprises a semi-permeable material, said semi-permeable material is in contact with said first solution on one side thereof and with said second solution on another side thereof, said first solution comprises at least one solvent capable of passing through said semi-permeable material, and said second solution comprises at least one solute which cannot pass through said semi-permeable material.

11. The passive sensor according to claim 1 wherein the housing of said sensor is a hollow housing having a hollow passage passing therein, said movable member comprises a flat member movably attached within said passage to sealingly close said passage, wherein one of said two acoustically reflecting surfaces is the surface of a portion of the walls of said housing substantially parallel to the acoustically reflecting surface of said movable member, said housing is configured to be sealingly mounted within a wall of a vessel containing a fluid such that said two acoustically reflecting surfaces are in contact with said fluid, wherein said physical variable is the pressure within said fluid.

12. A passive acoustic sensor for determining the value of a physical variable in a measurement region, the sensor comprising:

a housing;

first reflecting means formed in said housing or attached thereto, said first reflecting means has a first substantially flat acoustically reflecting surface for reflecting a first portion of incident acoustic waves directed perpendicular to said surface to form a first reflected wave;

second acoustically reflecting means formed in said housing or attached thereto, said second reflecting means has a second substantially flat acoustically reflecting surface substantially parallel to said first surface for reflecting a second portion of said incident acoustic waves to form a second reflected wave;

at least one of said first acoustically reflecting surface and second acoustically reflecting surface is a surface on a movable member configured to be movable with respect to said housing such that the distance between said first acoustically reflecting surface and said second acoustically reflecting surface varies as a function of said physical variable, said first and second acoustically reflecting means are configured such that said first reflected wave and said second reflected wave interfere to form a returning acoustic signal having at least one maximally attenuated frequency which is correlated with the value of said physical variable in the measurement region in which said sensor is disposed.

13. The passive sensor according to claim 12 wherein one or more of the physical parameters of said sensor is selected such that the intensity of said first reflected wave is substantially similar to the intensity of said second reflected wave to maximize the attenuation of said maximally attenuated frequency in said returning acoustic signal.

14. A system for determining the value of a physical variable in a measurement region, the system comprising:

at least one acoustic transducer configured for directing acoustic waves having a range of frequencies towards a passive acoustic sensor disposed in said measurement region;

at least one acoustic receiver configured for receiving acoustic waves reflected from said passive acoustic sensor to generate a received signal;

at least one passive acoustic sensor, said at least one sensor comprises a housing having at least two spaced apart substantially parallel and substantially flat acoustically reflecting surfaces, at least one of said acoustically reflecting surfaces is a surface on a movable member configured to be movable with respect to said housing such that the distance between said acoustically reflecting surfaces varies as a function of said physical variable; and a controller unit operatively coupled to said at least one transducer and to said at least one receiver, for controlling the operation of said at least one transducer and of said at least one receiver, said controller is configured for acquiring data representing said received signal, processing said data to determine the value of at least one maximal attenuation frequency within said range of frequencies, and determining the value of said physical variable from the value of said at least one maximal attenuation frequency.

15. The system according to claim 14 wherein at least one of said acoustic transducer and said acoustic receiver comprises at least one piezoelectric device.

16. The system according to claim 14 wherein said acoustic transducer is a piezoelectric transducer, and wherein said piezoelectric transducer is configured to operate as said acoustic receiver.

17. A method for determining a physical variable in a measurement region using a passive acoustic sensor, the method comprising the steps of:

disposing in said measurement region a passive acoustic sensor, said sensor comprises a housing having at least two spaced apart substantially parallel and substantially flat acoustically reflecting surfaces, at least one of said acoustically reflecting surfaces is a surface on a movable member configured to be movable with respect to said housing such that the distance between said acoustically reflecting surfaces varies as a function of said physical variable;

directing acoustic waves having a range of frequencies at said sensor such that a first portion of said waves is reflected from one of said acoustically reflecting surfaces to form a first reflected wave and a second portion of said incident waves is reflected from the remaining acoustically reflecting surface to form a second reflected wave, wherein said first reflected wave and said second reflected wave interfere to form a returning acoustic signal;

acquiring data representing said returning acoustic signal;

processing said data to determine the value of at least one maximal attenuation frequency; and determining the value of said physical variable from the value of said at least one maximal attenuation frequency.

18. The method according to claim 17 wherein said physical variable is the pressure in said measurement region.

19. The method according to claim 17 wherein said acoustic waves comprise sonic waves and ultrasonic waves.

20. The method according to claim 17 wherein said physical variable is the osmotic pressure in a first solution disposed in said measurement region, said housing has a second solution sealed therein, wherein at least one component of said sensor selected from one or more of the walls of said housing and said movable member comprises a semi-permeable material, said semi-permeable material is in contact with said first solution on one side thereof and with said second solution on another side thereof, said first solution comprises at least one solvent capable of passing through said semi-permeable material, and said second solution comprises at least one solute which cannot pass through said semi-permeable material.

21. The method according to claim 17 wherein said step of processing comprises performing frequency domain analysis of said data to obtain frequency domain data of said returning acoustic signal and determining said at least one maximal attenuation frequency from said frequency domain data.

22. The method according to claim 21 wherein said frequency domain analysis comprises performing a Fourier transform on said data to obtain Fourier transform data representing the intensity of said returning acoustic signal as a function of frequency and determining said at least one maximal attenuation frequency from said Fourier transform data.

23. The method according to claim 21 wherein said frequency domain analysis comprises performing a wavelet transform on said data to obtain wavelet transform data and determining said at least one maximal attenuation frequency from said wavelet transform data.

24. The method according to claim 17 wherein said step of determining comprises determining the value of said physical variable from the value of said one or more maximal attenuation frequency using a look up table or other calibration data obtained by calibrating said sensor.

25. The method according to claim 17 wherein said acoustic waves directed at said sensor are selected from a continuous beam of acoustic waves, one or more pulses of acoustic waves, chirped acoustic waves spanning said range of frequencies, and a tone burst series spanning said range of frequencies.

26. The method according to claim 17 further including the step of processing said data to compensate for variations in the intensity of the acoustic waves directed at said sensor at different frequencies, said variations are introduced by the characteristics of the acoustic transducer used to produce said acoustic waves.

27. The method according to claim 17 wherein said step of directing comprises directing said acoustic waves towards said sensor in a direction substantially perpendicular to said acoustically reflecting surfaces.

28. A method for using a passive acoustic sensor comprising a housing having at least two spaced apart substantially parallel and substantially flat acoustically reflecting surfaces, at least one of said acoustically reflecting surfaces is a surface on a movable member configured to be movable with respect to said housing such that the distance between said acoustically reflecting surfaces varies as a function of said physical variable, said sensor is disposed in a measurement region, the method comprising the steps of:

directing acoustic waves having a range of frequencies at said passive sensor such that a first portion of said waves is reflected from one of said acoustically reflecting surfaces to form a first reflected wave and a second portion of said incident waves is reflected from the remaining acoustically reflecting surface to form a second reflected wave, wherein said first reflected wave and said second reflected wave interfere to form a returning acoustic signal;

acquiring data representing said returning acoustic signal; and processing said data to determine the value of at least one maximal attenuation frequency within said range of frequencies.

29. The method according to claim 28 further including the step of determining the value of a physical variable in said measurement region from the value of said at least one maximal attenuation frequency.

30. The method according to claim 29 wherein said physical variable is the pressure in said measurement region.

31. The method according to claim 29 wherein said physical variable is the osmotic pressure in a first solution disposed in said measurement region, said housing has a second solution sealed therein, wherein at least one component of said sensor selected from one or more of the walls of said housing and said movable member comprises a semi-permeable material, said semi-permeable material is in contact with said first solution on one side thereof and with said second solution on another side thereof, said first solution comprises at least one solvent capable of passing through said semi-permeable material, and said second solution comprises at least one solute which cannot pass through said semi-permeable material.

* * * * *